United States Patent
Iwasaki et al.

(10) Patent No.: US 7,613,325 B2
(45) Date of Patent: Nov. 3, 2009

(54) HUMAN DETECTION DEVICE AND HUMAN DETECTION METHOD

(75) Inventors: Masahiro Iwasaki, Ikoma (JP); Taro Imagawa, Hirakata (JP); Kenji Nagao, Yokohama (JP); Etsuko Nagao, legal representative, Yokohama (JP)

(73) Assignee: Panasonic Corporation, Osaka (JP)

( * ) Notice: Subject to any disclaimer, the term of this patent is extended or adjusted under 35 U.S.C. 154(b) by 716 days.

(21) Appl. No.: 11/320,416

(22) Filed: Dec. 29, 2005

(65) Prior Publication Data

US 2006/0115116 A1 Jun. 1, 2006

Related U.S. Application Data

(63) Continuation of application No. PCT/JP2004/011790, filed on Aug. 11, 2004.

(30) Foreign Application Priority Data

Aug. 21, 2003 (JP) ............................ 2003-297118

(51) Int. Cl.
G06K 9/00 (2006.01)
H04N 7/18 (2006.01)
H04N 5/225 (2006.01)

(52) U.S. Cl. ...................... 382/103; 382/107; 348/143; 348/169

(58) Field of Classification Search ................. 382/103, 382/107; 348/143–161, 169–172
See application file for complete search history.

(56) References Cited

U.S. PATENT DOCUMENTS 5,574,762 A 11/1996 Sato et al.

(Continued)

FOREIGN PATENT DOCUMENTS

JP 7-121499 5/1995

(Continued)

OTHER PUBLICATIONS

Sourabh A. Niyogi et al., "Analyzing and Recognizing Walking Figures in XYT," M.I.T. Media Lab Vision and Modeling Group Technical Report, No. 223, 1994, pp. 1-12.

*Primary Examiner*—Aaron W Carter
(74) *Attorney, Agent, or Firm*—Wenderoth, Lind & Ponack, L.L.P.

(57) ABSTRACT

The present invention provides a human detection device which detects a human contained in a moving picture, and includes the following: a spatiotemporal volume generation unit which generates a three-dimensional spatiotemporal image in which frame images that make up the moving picture in which a human has been filmed are arranged along a temporal axis; a spatiotemporal fragment extraction unit which extracts a real image spatiotemporal fragment, which is an image appearing in a cut plane or cut fragment when the three-dimensional spatiotemporal image is cut, from the generated three-dimensional spatiotemporal image; a human body region movement model spatiotemporal fragment output unit which generates and outputs, based on a human movement model which defines a characteristic of the movement of a human, a human body region movement spatiotemporal fragment, which is a spatiotemporal fragment obtained from a movement by the human movement model; a spatiotemporal fragment verification unit which verifies between a real image spatiotemporal fragment and a human body region movement model spatiotemporal fragment; and an attribute output unit which outputs a human attribute which includes the presence/absence of a human in the moving picture, based on that verification result.

27 Claims, 26 Drawing Sheets

U.S. PATENT DOCUMENTS

2001/0046309 A1 * 11/2001 Kamei .................. 382/103

FOREIGN PATENT DOCUMENTS

| JP | 8-123935 | 5/1996 |
| JP | 2001-109891 | 4/2001 |
| JP | 3183320 | 4/2001 |
| JP | 2001-202379 | 7/2001 |
| JP | 2001-266131 | 9/2001 |

* cited by examiner

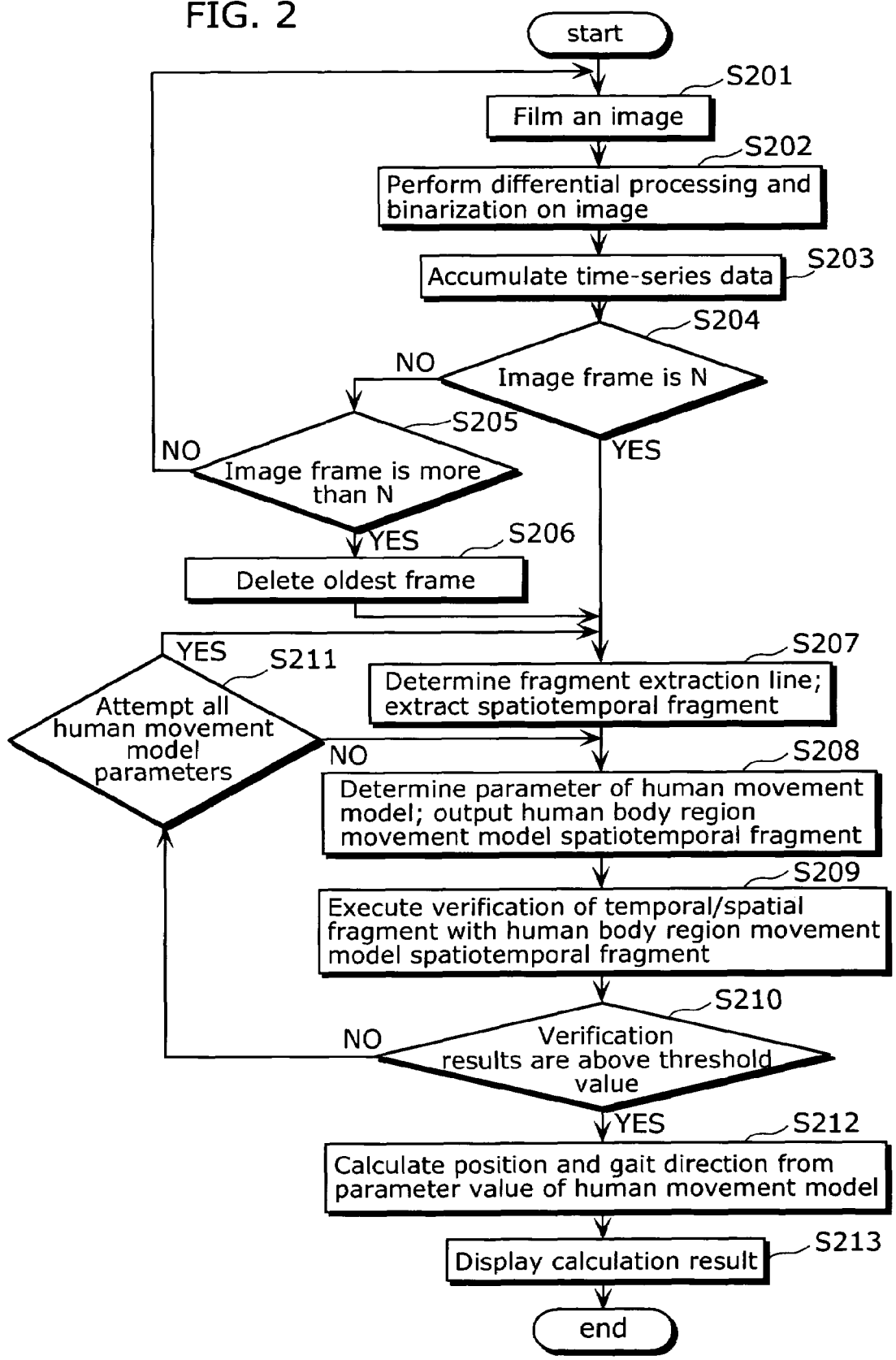

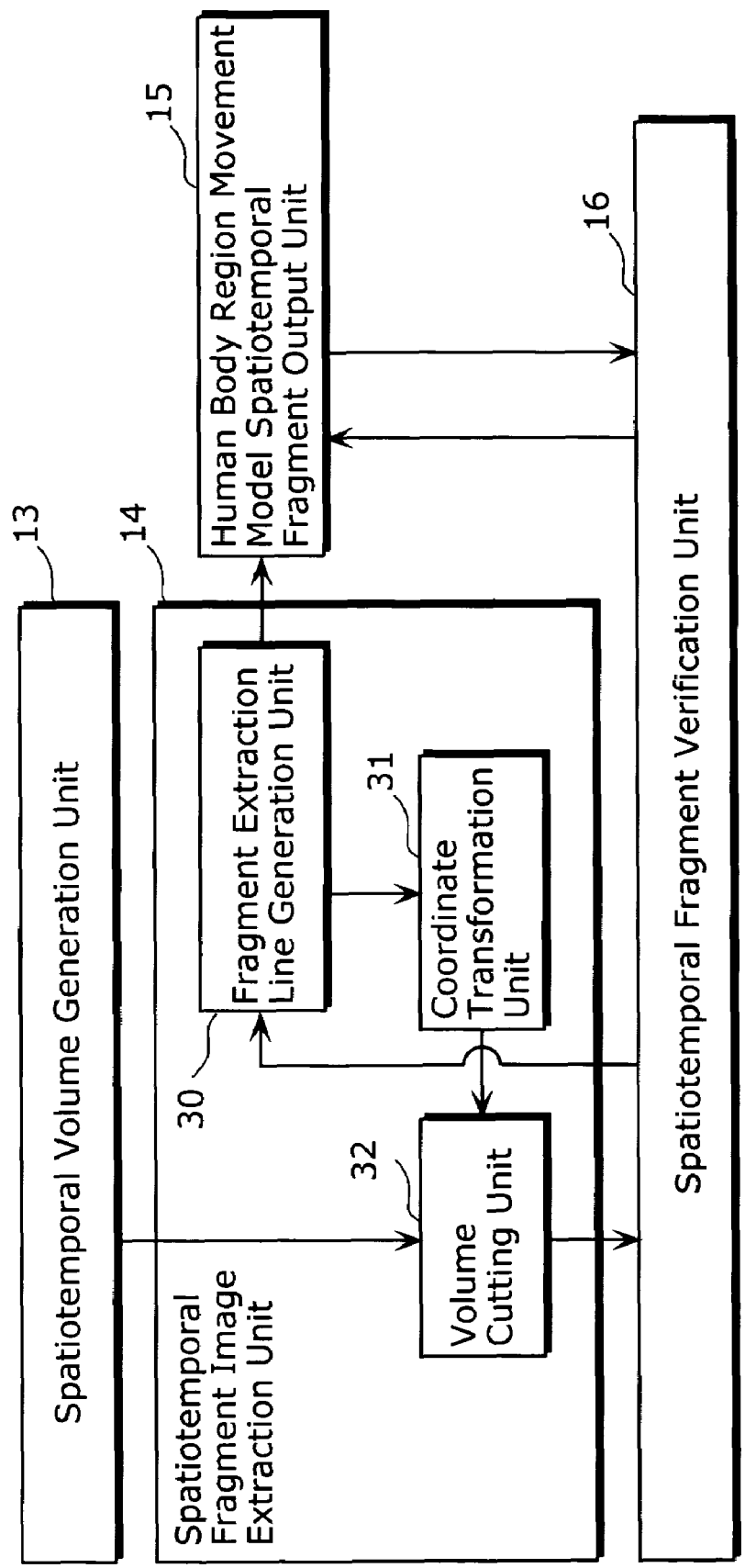

Spatiotemporal Fragment 70

Human Body Region Movement
Model Spatiotemporal Fragment 71

FIG. 13
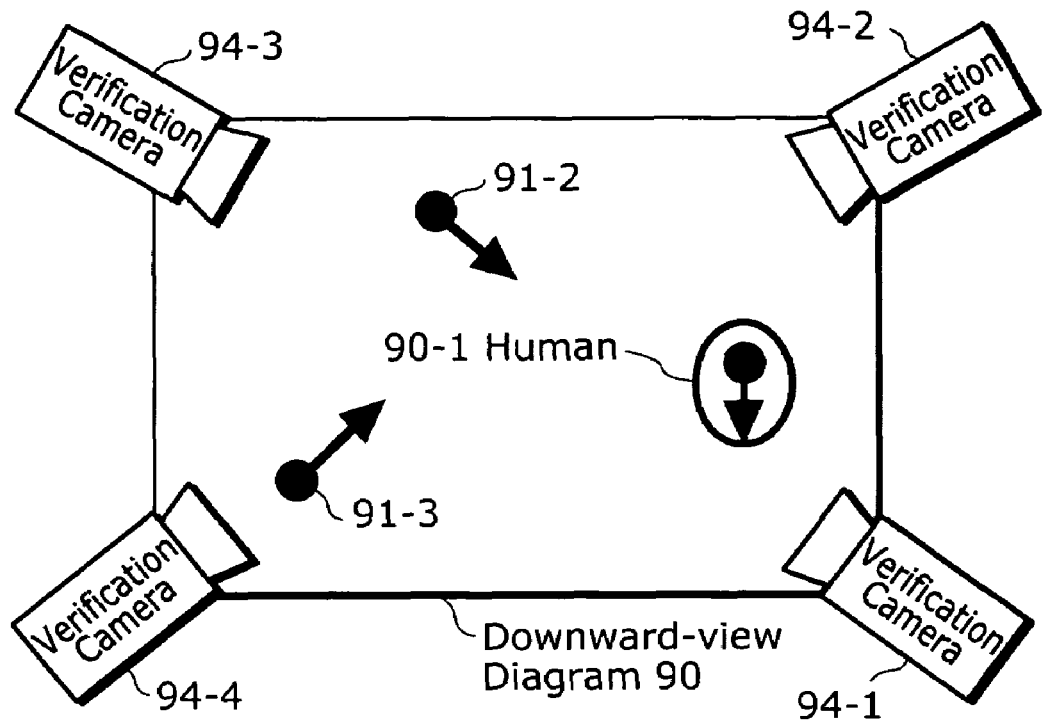
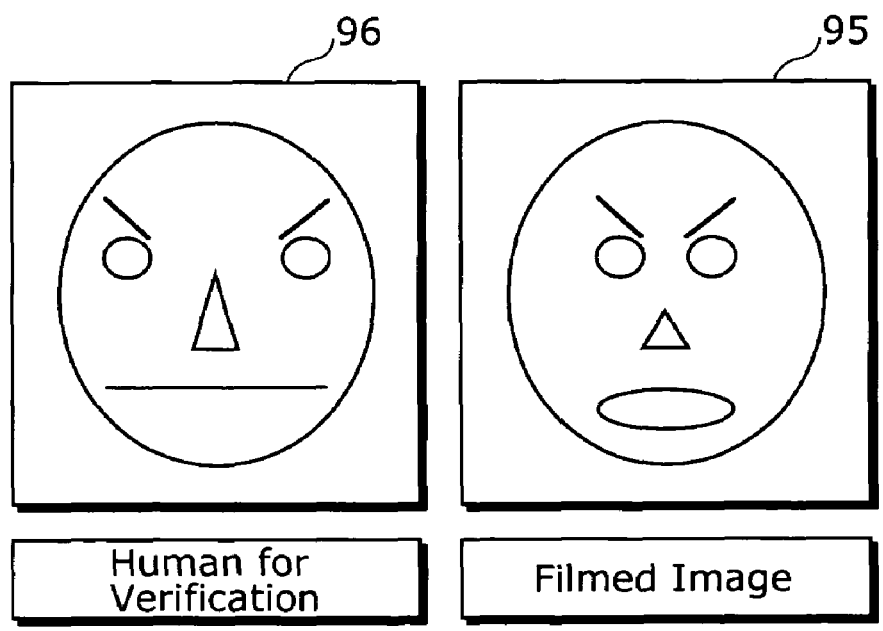

Motion Vector 190

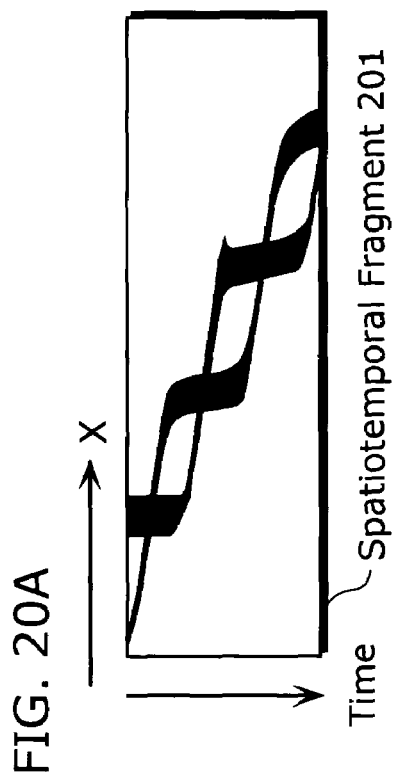
FIG. 20A
FIG. 20B
FIG. 20C  $C(\tau)$
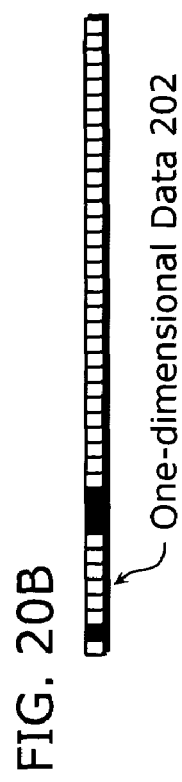
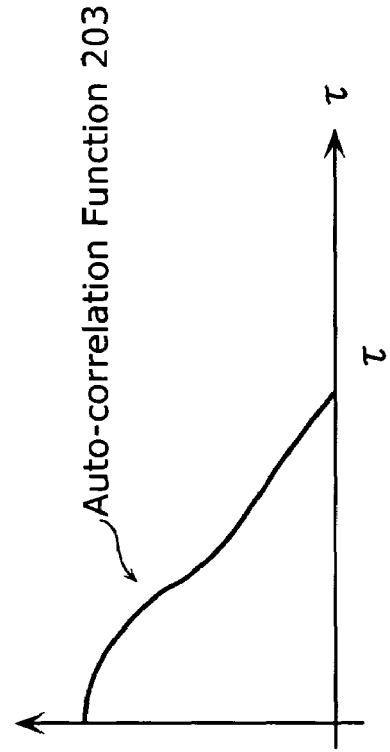
FIG. 20D
FIG. 20E
FIG. 20F  $C(\tau)$
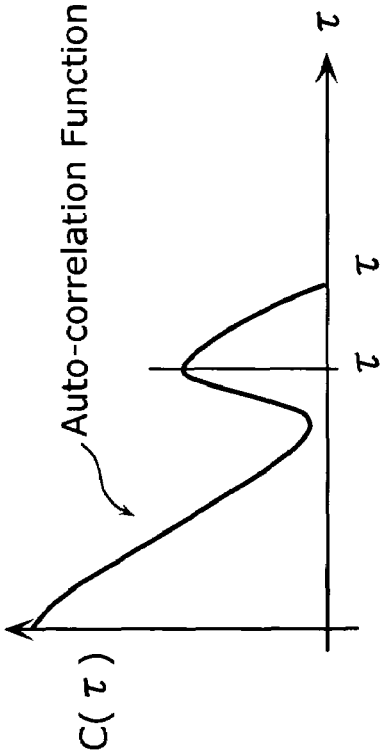

FIG. 24

Human Movement Model Template (By Human Type)

|  | ω(° /sec) | θ(°) | L(mm) |
|---|---|---|---|
| Adult (Man) | 85.0° | 25.0 | 900 |
| Adult (Woman) | 85.0° | 22.5 | 800 |
| Child | 70.0° | 22.5 | 500 |
| Elderly Person | 60.0° | 17.5 | 800 |

FIG. 25

Human Movement Model Template
(By Road State Type, for Adult Man)

| | ω(°/sec) | θ(°) | L(mm) |
|---|---|---|---|
| Outside | 85.0° | 25.0 | 900 |
| Outside (Wet) | 82.5° | 22.5 | 900 |
| Gravel Road | 85.0° | 22.5 | 900 |
| Indoors | 80.0° | 25.0 | 900 |

FIG. 26

Human Movement Model Template
(By Amount of Congestion, for Adult Man)

|   | $\omega$(°/sec) | $\theta$(°) | L(mm) |
|---|---|---|---|
| 1 | 85.0° | 25.0 | 900 |
| 2 | 83.5° | 22.5 | 900 |
| 3 | 82.0° | 20.0 | 900 |

HUMAN DETECTION DEVICE AND HUMAN DETECTION METHOD

CROSS-REFERENCE TO RELATED APPLICATION

This is a continuation of PCT Application No. PCT/JP2004/011790, filed on Aug. 11, 2004.

BACKGROUND OF THE INVENTION (1) Field of the Invention

The present invention relates to a human detection device which detects a walking human through an image processing, and in particular, a human detection device which detects the position of presence and gait direction of a human.

(2) Description of the Related Art

Much of the conventional human detection art utilizes a still image or a single differential image. In the case where human detection is executed using a still picture or a single differential image, because it is difficult to predict a shape characteristic change of a human which can arise from screening, etc. at the time of design, there are cases of false detection, non-detection, and so on. However, with a method which utilizes an image sequence, because interpolation and a prediction mechanism can be utilized in response to a temporary fluctuation in the quantity of characteristics that arises from screening, etc, a robust detection can be expected even with screening and a temporary environment fluctuation.

Conventionally, as a human detection art which utilizes a moving picture sequence (the first conventional art), a method is provided in which a human is detected through generating a three-dimensional spatiotemporal image by arranging images in temporal direction, extracting a spatiotemporal fragment image which cuts the three-dimensional spatiotemporal image along the ankle location of the human per frame, and executing detection of a periodicity unique to the human gait (for example, Niyogi, Adelson, "Analyzing and Recognizing Walking Figures in XYT," *MIT-TR*-223, 1994, Page 3 and FIG. 3). Through this, it is possible to distinguish between a human and another moving body, and furthermore, by utilizing an image sequence, stable human detection is possible even with temporary change in environment.

In addition, as a different conventional art (the second conventional art), a method is provided which places a plurality of slits in an image, forms a moving body image utilizing a temporal pixel value change of the slit area, and assesses the movement direction of a moving body as well as counting (for example, Japanese Patent Application No. 3183320, Page 7 and FIG. 4). With this art, stable detection of a human and determination of the movement direction becomes possible by considering the temporal change of a human passing the slits.

However, in the aforementioned first conventional art, the art is limited to the case where the ankle position of the human is already known, and walking occurs only in left-right directions throughout the image. Additionally, as it is necessary to detect the ankle position in advance, initial detection of a human is a prerequisite. Therefore, there is a problem in that it is difficult to detect a human walking in various directions within the image.

In addition, in the aforementioned second conventional art, while it is possible to detect the gait direction through placing a plurality of slits for detecting a human throughout an image, it is necessary for a designer to decide the slit position in advance. Therefore, there is a problem in that the area in which human detection can be executed throughout the image is limited.

SUMMARY OF THE INVENTION

Accordingly, in view of the aforementioned problems, the present invention has an objective to provide a human detection device which can execute human detection that includes a position of existence and gait direction of a human without limiting the detection area throughout the image, even in the case where the walking direction of a human is not consistent.

To achieve the aforementioned objects, a human detection device according to the present invention is a human detection device which detects a human within a moving picture, and includes: a spatiotemporal volume generation unit which generates a three-dimensional spatiotemporal image in which frame images are arranged along a temporal axis, the frame images making up the moving picture in which a human has been filmed; a spatiotemporal fragment extraction unit which extracts, from the generated three-dimensional spatiotemporal image, a real image spatiotemporal fragment which is an image appearing in a cut plane or cut fragment when the three-dimensional spatiotemporal image is cut; a spatiotemporal fragment output unit which generates and outputs, based on a human movement model which defines a characteristic of a movement of a human, a human body region movement spatiotemporal fragment, which is a spatiotemporal fragment obtained from the movement by the human movement model; a spatiotemporal fragment verification unit which verifies a real image spatiotemporal fragment extracted by the spatiotemporal fragment extraction unit with a human body region movement model spatiotemporal fragment outputted by said spatiotemporal fragment output unit; and an attribute output unit which outputs a human attribute which includes a presence/absence of a human in the moving picture, based on a verification result of the spatiotemporal fragment verification unit.

Through this, a real image spatiotemporal fragment generated from a real image is verified with a human body region movement model spatiotemporal fragment generated from a human movement model expressing a movement of a typical human. Therefore, for example, a search of the human body region movement model spatiotemporal fragment and the real image spatiotemporal fragment, in which alignment of the verification fulfills a consistent criteria, is possible, so human detection that includes the position of existence and gait direction of a human can be executed without limiting the gait direction of the human, the detection area throughout the image, and so on.

Here, the spatiotemporal fragment extraction unit determines a fragment extraction line which cuts the frame image, and extracts the real image spatiotemporal fragment as a plane obtained by lining the determined fragment extraction line along the temporal axis as a cut plane; for example, extracts the real image spatiotemporal fragment using a fragment extraction line which cuts the legs of the human in the three-dimensional spatiotemporal image. On the other hand, the spatiotemporal fragment output unit generates, based on a human movement model defined by the gait characteristics of a human, a human body region movement model spatiotemporal fragment obtained through the cut plane that cuts the legs during the gait time of the human movement model in question. Through this, human detection which utilizes the unique gait characteristics in human movement is executed, and mistaken detection of a moving object which does not have gait characteristics, such as a car and the like, is avoided.

Note that, for example, a model in which two legs are represented by two line segments connected at one end, and each line segment alternately rotates at a set angular speed ω to a maximum angle of $2\theta_L$ with the rotation central to the connected point, can be given as a specific example of a human movement model.

In addition, it is preferable for the spatiotemporal fragment verification unit to execute the verification of the real image spatiotemporal fragment through calculating the alignment of the images when one step part of the human body region movement model spatiotemporal fragment, outputted from the spatiotemporal fragment output unit, is scanned in temporal direction.

In addition, the human detection device may further include a movement direction calculation unit which calculates, from a three-dimensional spatiotemporal image generated by the spatiotemporal volume generation unit, a movement direction of a moving object that exists in the three-dimensional spatiotemporal image, and the spatiotemporal fragment extraction unit may determine the fragment extraction line in accordance with a movement direction calculated by the movement direction calculation unit. At this time, the movement direction calculating unit may calculate the movement direction of the moving object by, for example, extracting the moving object per frame composed of the three-dimensional spatiotemporal image and finding a motion vector occurring between frame images of the extracted moving object. The movement direction calculating unit may also calculate the movement direction of the moving object by dividing each frame image composed of the three-dimensional spatiotemporal image into subregions and finding a motion vector occurring between frame images in each subregion. Through this, the fragment extraction line is determined as the movement direction of the human is tracked, so regardless of the position and movement direction of the human, a fragment extraction line that generates the most appropriate spatiotemporal fragment, such as a fragment extraction line that continually cuts the leg of a human regardless of the human's position within the image, is automatically determined. Note that the fragment extraction line is, for example, a straight line or a curved line.

In addition, the attribute output unit may calculate and output a position and movement direction of a human in the moving picture from parameters which specify the cut plane or cut fragment and parameters which specify the human movement model, in the case where the real image spatiotemporal fragment and the human body region movement model spatiotemporal fragment are verified as matching according to a constant criteria, and the human detection device may further include a display unit which displays a human attribute which includes the position and movement direction of a human outputted by the attribute output unit. Through this, not only the presence/absence of a human in a moving image, but also the position and movement direction of the detected human, is specified, and use in camera tracking control occurring in surveillance devices becomes possible.

In addition, the human detection device may further include a periodicity analysis unit which analyzes whether or not a real image spatiotemporal fragment extracted by said spatiotemporal fragment extraction unit is an image corresponding to a periodic movement unique to a gait of a human, and the spatiotemporal fragment extraction unit may change a fragment extraction line based on an analysis result from the periodicity analysis unit, and using the changed fragment extraction line, extract a real image spatiotemporal fragment again. At this time, the periodicity analysis unit, for example, generates time-series data of a correlation length by finding an autocorrelation function for one-dimensional data showing an image occurring in each time which composes the real image spatiotemporal fragment. In the case where periodicity exists in the generated time-series data of the correlation length, the periodicity analysis unit determines that the real image spatiotemporal fragment is an image based on a periodic motion unique to a human gait, and obtains a graph showing a change in the autocorrelation function value for the correlation length through obtaining an autocorrelation function for the time-series data of the correlation length. In the case where a peak exists in that graph, the periodicity analysis unit may determine that periodicity exists in the time-series data of the correlation length. Through this, the parameters of the fragment extraction line are altered so that a periodicity based on the gait characteristics unique to the movement of the human is detected in the real image spatiotemporal fragment and set, and therefore the human can be detected with certainty independent of the gait direction and position of the human.

In addition, the human detection device may further include a parameter searching unit which searches for the optimum parameters which specify the cut plane or cut fragment and the optimum parameters which specify the human movement model, by executing at least one of the following: causing re-extraction of a real image spatiotemporal fragment after causing said spatiotemporal fragment extraction unit to change parameters specifying the cut plane or cut fragment based on a verification result from the spatiotemporal fragment verification unit; and causing re-output of a human body region movement model spatiotemporal fragment after causing said spatiotemporal fragment output unit to change parameters specifying the human movement model. At this time, it is preferable for the parameter searching unit to search for the optimum parameters using, for example, a genetic algorithm. Through this, highly accurate parameters can be determined in a shorter time, and detection of the present position and movement direction of the human becomes precise.

In addition, the spatiotemporal volume generation unit may generate the three-dimensional spatiotemporal image by superimposing at least one image obtained through binarization after the frame image is background-differentiated or frame-differentiated. Through this, a three-dimensional spatiotemporal image is generated from a moving object only, so higher verification speed and accuracy can be achieved.

In addition, the spatiotemporal fragment output unit generates and outputs a human body region movement model spatiotemporal fragment corresponding to a human movement model selected from a pre-recorded plurality of differing human movement models, and the spatiotemporal fragment verifying unit may repeat the verification in the case where the verification results do not fulfill a constant criteria, by causing the spatiotemporal fragment output unit to generate and output a human body region movement model spatiotemporal fragment corresponding to a new human movement model. At this time, as an example of the plurality of human movement models pre-recorded by the spatiotemporal fragment output unit, at least one of the sex, age of the human to be modeled, the condition of the road surface walked by the human, and the congestion degree of the place walked may be made to differ. Through this, it becomes possible to judge not only the presence/absence of a human, position, and movement direction included in a moving picture, but also the sex, age of the human, and the environment of the movement space, including the state of the road surface, the congestion degree, and the like.

Note that the present invention may also be realized as a human verification device which verifies an image of a human included in a moving picture with a pre-stored image of a human, the human verification device including: the aforementioned human detection device; a verification camera having at least one of the functions of pan, tilt, and zoom; a camera control unit which controls at least one of the pan, tilt, and zoom of the verification camera, based on a position or movement direction of a human detected by the human detection device; and a human verification unit which verifies an image of a human filmed by the verification camera with a pre-stored image of a human. Through this, the present invention can be applied to a human surveillance device, a human identification device, and so on, which search for a specific human, identify a human, and so on.

In addition, the present invention may also be realized as a human model fitting device which causes a human movement model defining a movement characteristic of a human to be fitted to a movement of a human in an image, the human model fitting device including: a spatiotemporal volume generation unit which generates a three-dimensional spatiotemporal image in which frame images that make up the moving picture in which a human has been filmed are arranged along a temporal axis; a spatiotemporal fragment extraction unit which extracts a real image spatiotemporal fragment, which is an image appearing in a cut plane or cut fragment when the three-dimensional spatiotemporal image is cut, from the generated three-dimensional spatiotemporal image; a spatiotemporal fragment output unit which generates and outputs a human body region movement spatiotemporal fragment, which is a spatiotemporal fragment obtained from a movement by the human movement model; a spatiotemporal fragment verification unit which verifies a real image spatiotemporal fragment extracted by the spatiotemporal fragment extraction unit with a human body region movement model spatiotemporal fragment outputted by the spatiotemporal fragment output unit; and a model fitting unit which determines a value of parameters which specifies the human movement model so that the human movement model indicates a movement of a human occurring in the moving picture, based on a verification result from said spatiotemporal fragment verification unit. Through this, a model can be fitted to the human present in an image without attaching a particular device such as a marker to an object, and model data which reflects the personality each individual person has can be easily created. Therefore, a device which detects a specific human can be realized by using the created model data as a reference criteria.

In addition, the present invention can also be realized as an image generation device which generates an image used in detecting a human included within a moving picture, and when a spatiotemporal fragment is an image of a cut plane or a cut fragment obtained when a three-dimensional spatiotemporal image in which frame images that make up the moving picture are arranged along a temporal axis is cut, the image generation device includes a spatiotemporal fragment output unit which generates and output a human body region movement spatiotemporal fragment, which is a spatiotemporal fragment obtained from a movement by the human movement model, based on a human movement model which defines a movement characteristic of a human. Through this, a spatiotemporal fragment expressing a characteristic human body region movement is generated from a human movement model, so, for example, it can be used solely as a device for generating criteria data corresponding to each type of human model data, which is used for reference in the abovementioned human detection device.

Note that the present invention can be realized not only as this type of human detection device, human identification device, human model fitting device, and image generation device, but can also be realized as a human detection method, a human identification method, a human model fitting method, and an image generation method, as well as a program which causes a computer to execute that type of method, and a computer-readable recording medium recorded with that program.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a flowchart showing a processing of the human detection device in the first embodiment of the present invention;

FIG. 4 is a function block diagram showing a configuration of a spatiotemporal fragment extraction unit in the first embodiment of the present invention;

FIG. 13 is a diagram showing a display of a display unit in the third embodiment of the present invention;

FIGS. 20A, 20B, 20C, 20D, 20E, and 20F are diagrams showing an example of an autocorrelation function calculation in the fifth embodiment of the present invention;

FIG. 24 is a diagram showing an example of a human movement model template by type;

FIG. 25 is a diagram showing an example of a plurality of human movement model templates for differing states in roads walked; and FIG. 26 is a diagram showing an example of a plurality of human movement model templates in differing congestion degrees of walked places.

DESCRIPTION OF THE PREFERRED EMBODIMENT(S)

The embodiments of the present invention are described below with reference to the diagrams.

First Embodiment

First, a human detection device in the first embodiment of the present invention is described.

Figure 1:
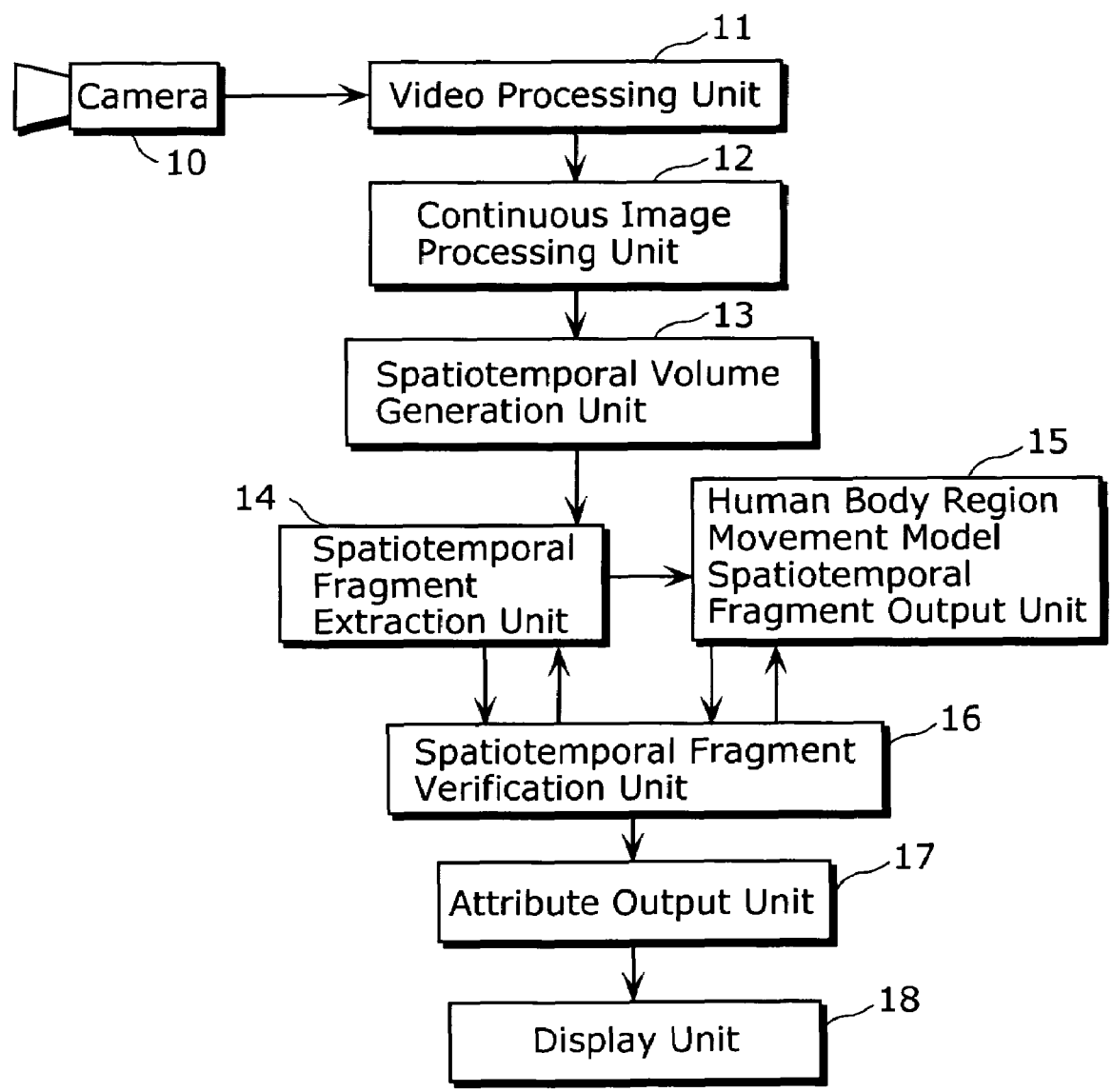
FIG. 1 is a function block diagram showing a human detection device in the first embodiment of the present invention.

FIG. 1 is a function block diagram showing a human detection device in the first embodiment of the present invention. This human detection device is a device which detects a human that exists within a video filmed in a shop, a parking lot, a street, and the like, and includes a camera 10, a video processing unit 11, a continuous image processing unit 12, a spatiotemporal volume generation unit 13, a spatiotemporal fragment extraction unit 14, a human body region movement model spatiotemporal fragment output unit 15, a spatiotemporal fragment verification unit 16, an attribute output unit 17, and a display unit 18. Note that in the present embodiment, a case where a spatiotemporal fragment is extracted as an image is described, but the spatiotemporal fragment does not have to be an image, but can also be parameters extracted through the application of a straight line, an ellipse, a characteristic volume, and the like extracted from an image.

In FIG. 1, the camera 10 is an imaging device which films a video and outputs the filmed video per frame to the video processing unit 11. The video processing unit 11 executes interframe differential processing or background differential processing per frame on the inputted image, and is a processing unit which binarizes a video according to a threshold value.

The continuous image processing unit 12 is a processing unit which, in the case where a three-dimensional spatiotemporal image is generated from the input images, accumulates the input images in time order of the frames; or, in the case where spatiotemporal volume is generated without images, executes fitting of a straight line, an ellipse, a feature extraction using inputted images, and the like, and stores those results as parameters in time order.

The spatiotemporal volume generation unit 13 is a processing unit which generates a spatiotemporal volume using N number of images of a pre-determined number of frames or parameters. The spatiotemporal fragment extraction unit 14 is a processing unit which extracts a spatiotemporal fragment using the spatiotemporal volume generated by the spatiotemporal volume generation unit 13. Here, the spatiotemporal fragment is an image appearing in a cut fragment or a cut plane when a three-dimensional spatiotemporal image indicated by the spatiotemporal volume is cut along the temporal axis. For example, it is an image appearing in the cut surface when a three-dimensional spatiotemporal image is cut parallel to the horizontal axis of the frame as well as the temporal axis of the frame, and in such a time, is a two-dimensional image made up of the horizontal axis and temporal axis of the frame. Note that the cut fragment refers to a cut surface which has a thickness, and images appearing in a cut fragment are three-dimensional images.

The human body region movement model spatiotemporal fragment output unit 15 is a processing unit which outputs a human body region movement model spatiotemporal fragment in accordance with a human movement model. The spatiotemporal fragment verification unit 16 is a processing unit which executes verification between a spatiotemporal fragment from a real image generated in the spatiotemporal fragment extraction unit 14 and a human body region movement model spatiotemporal fragment generated from a movement model in the human body region movement model spatiotemporal fragment output unit 15.

The attribute output unit 17 is a processing unit which uses the results of the spatiotemporal fragment verification unit 16 to calculate the position, gait direction, angular rate, and the like of a detected human, estimate the position of existence of the human after t seconds, and so on. The display unit 18 is a processing unit and display which arranges and displays the position of existence and gait direction of a human detected by the spatiotemporal fragment verification unit 16 in a downward view diagram.

Hereafter, the flowchart in FIG. 2 is used to describe in detail the operation of the human detection device in the present embodiment.

First, in S201, the camera 10 films a video of an appropriate object, such as a moving object. Note that it is also acceptable for the camera 10 to be configured of a plurality of cameras.

Next, in S202, the video processing unit 11 executes interframe differential processing or background differential processing on the video inputted from the camera 10, and binarizes according to a threshold value. Note that in the case where background differential processing is executed, an image in which a human does not exist is prepared in advance as the background.

Next, in S203, in order to generate a spatiotemporal volume, the continuous image processing unit 12 stores the binary processed image as a buffer in a built-in hard disk, and sends the image per frame to the spatiotemporal volume generation unit. In the case where the spatiotemporal volume is generated from something aside from images, the continuous image processing unit executes feature extraction and fitting of an ellipse, a straight line, and the like using the input image, and outputs that result as parameters.

Next, in S204 to S206, the spatiotemporal volume generation unit 13 generates a spatiotemporal volume using an image with a pre-determined frame number N amount or a time N amount. Here, in the case where the image N+1 is newly sent from the continuous image processing unit, in S206, a spatiotemporal volume which holds an image of N frame amount is always generated through revoking the first image of the spatiotemporal volume.

Note that a generation method for the spatiotemporal volume is discussed later. Here, it is not necessary to input and revoke one image at a time. Any method which acquires continuous data of time N amount is acceptable.

Next, in S207, the spatiotemporal fragment extraction unit 14 determines parameters of a fragment extraction line, and using the set fragment extraction line, extracts a spatiotemporal fragment from the spatiotemporal volume generated by the spatiotemporal volume generation unit 13.

Figure 3A:
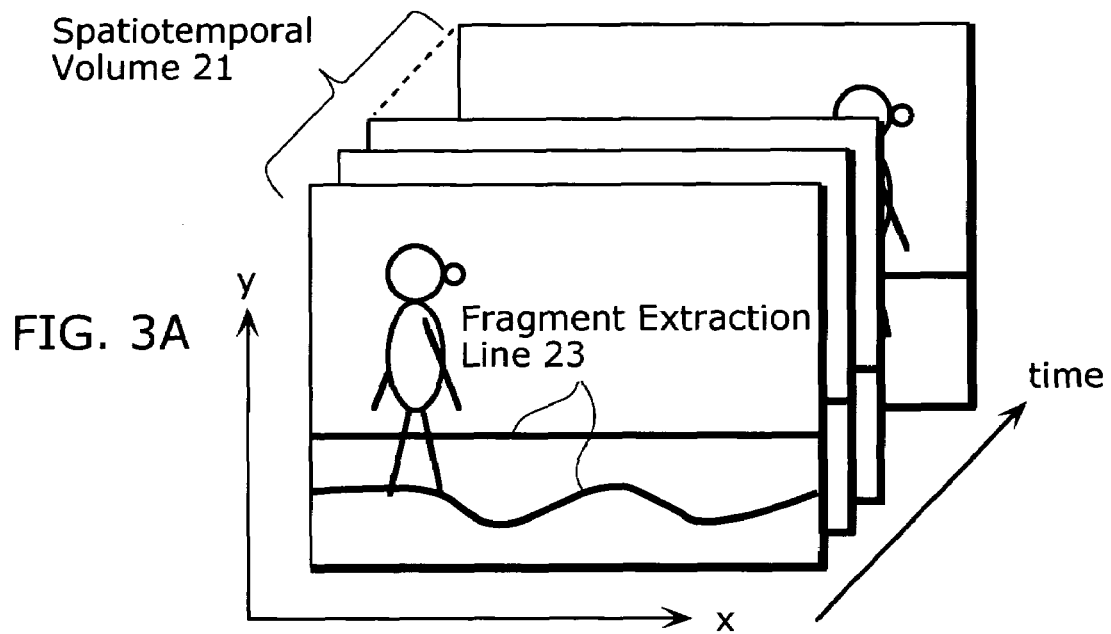
FIGS. 3A and 3B are diagrams showing an extraction of a spatiotemporal fragment in the first embodiment of the present invention.
Figure 3B:
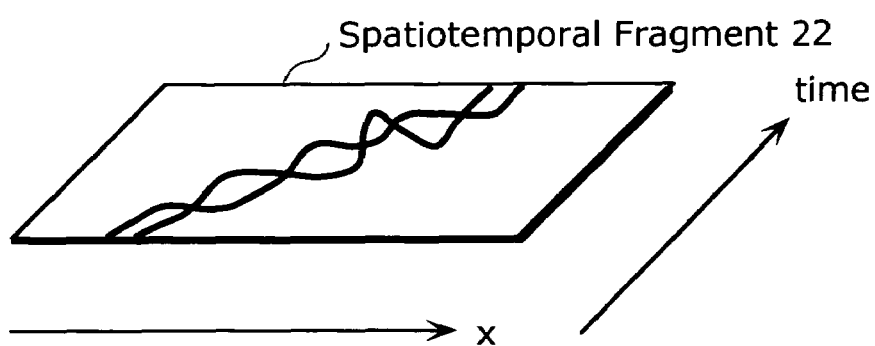

Here, a method for creating the spatiotemporal fragment is described using FIG. 3. FIG. 3A shows a spatiotemporal volume 21, and FIG. 3B shows a spatiotemporal fragment 22 determined by a fragment extraction line 23. The spatiotemporal fragment 22 shown in FIG. 3B is a diagram which has arranged one-dimensional images of the fragment extraction line occurring in each frame along a temporal axis, which makes up the spatiotemporal volume 21, and is equivalent to an image found in a cut plane when a three-dimensional image indicated by the spatiotemporal volume 21 is cut along the temporal axis.

Here, the fragment extraction line 23 for extracting the spatiotemporal fragment can be not only a straight line, but a curved line as well, as shown in FIG. 3A. The line may further be a line which has a constant thickness (size). Note that a method for determining the fragment extraction line is discussed later.

Next, in S208, the human body region movement model spatiotemporal fragment output unit 15 determines a human movement model parameter based on the parameters of the fragment extraction line determined in S207, and generates a human body region movement model spatiotemporal fragment from the human movement model generated based on the determined human movement model parameter. Note that methods for determining the human movement model parameter and for generating the human body region movement model spatiotemporal fragment are discussed later.

Next, in S209, the spatiotemporal fragment verification unit 16 executes verification between the spatiotemporal fragment extracted by the spatiotemporal fragment extraction unit 14 and the human body region movement model spatiotemporal fragment generated by the human body region movement model spatiotemporal fragment output unit 15.

Then, in S210, the spatiotemporal fragment verification unit 16 verifies the spatiotemporal fragment with the human body region movement model spatiotemporal fragment, and in the case where the verification results do not match (NO of S210), the process moves to S211. When all parameters of the human movement model have not been attempted (NO of S211), the process moves to S208, and the human body region movement model spatiotemporal fragment output unit 15 generates a new human body region movement model spatiotemporal fragment. On the other hand, when all parameters of the human movement model have been attempted (YES of S211), the process moves to S207, and the spatiotemporal fragment extraction unit 14 determines the fragment extraction line 23 again.

However, in S210, in the case where, in the verification results, the spatiotemporal fragment and the human body region movement model spatiotemporal fragment match or the results are above the threshold (YES of S210), the spatiotemporal fragment verification unit 16 outputs parameters of the fragment extraction line that occur at that point in time and the human movement model parameters to the attribute output unit 17.

Then, in S212, the attribute output unit 17 calculates the position of existence and gait direction and outputs them to the display unit 18, in the case where the presence of a human has been confirmed. Finally, in S213, the display unit 18 displays the presence in a screen the presence/absence of a human, the position of existence, and the gait direction, in a screen.

Here, the spatiotemporal fragment extraction unit 14 is described in detail using FIG. 4. As shown in FIG. 4, the spatiotemporal fragment extraction unit includes: a fragment extraction line generation unit 30, which determines the fragment extraction line 23 that cuts the spatiotemporal volume in the world coordinate system, which is a coordinate axis that expresses in real space a position of existence and gait direction of a human occurring in real space; a coordinate transformation unit 31, which, using parameters pertaining to the position of the camera 10, transforms the world coordinate system to a pixel coordinate system that expresses an image plane; and a spatiotemporal volume cutting unit 32, which extracts the spatiotemporal fragment 22 from the spatiotemporal volume 21.

The case where a straight line is generated as the fragment extraction line is described below.

First, the fragment extraction line generation unit 30 defines a straight line and a curved line in world coordinates. Here, the fragment extraction line generation unit 30 uses the world coordinate system, which expresses a coordinate axis in real space, to generate a straight line and a curved line based on the position of existence and gait direction of the human occurring in real space.

Note that world coordinates are indicated by ($X_W$, $Y_W$, and $Z_W$). Details regarding world coordinates can be found on page 9 of Xu, Tsuji, *Three-Dimensional Vision*, Kyoritsu: 1998.

Figure 5:
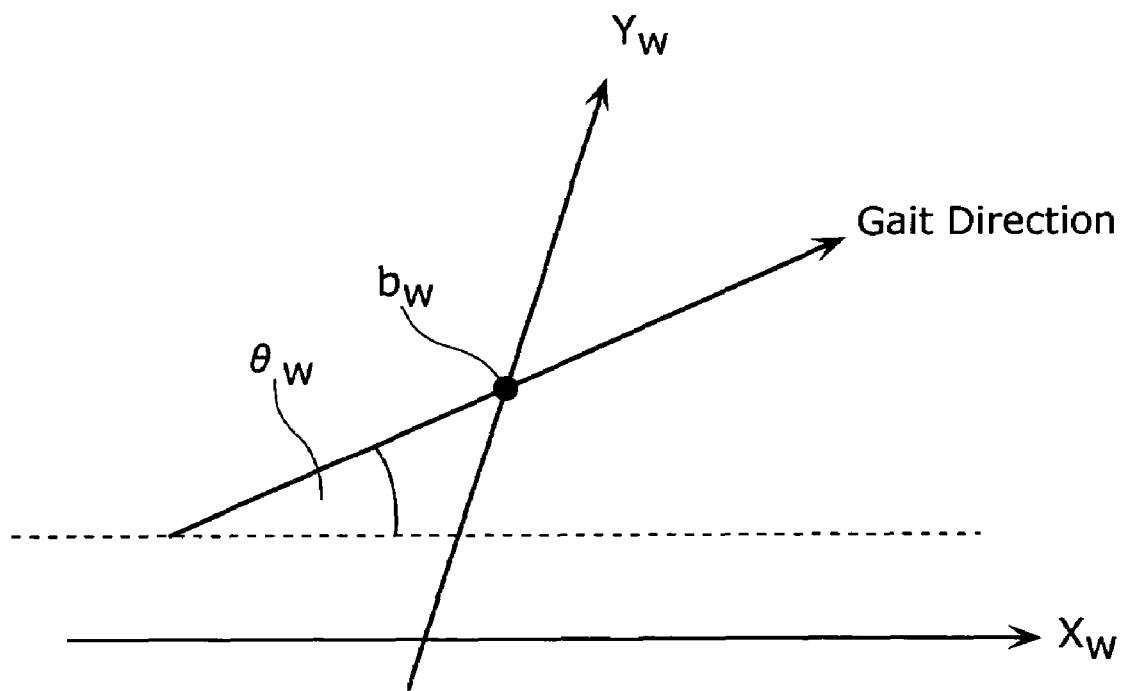
FIG. 5 is a diagram showing a fragment extraction line in world coordinates in the first embodiment of the present invention.

Here, when $Z_W$ is assumed in vertical direction in world coordinates and $Z_W$ is a constant value, the fragment extraction line 23 in world coordinates, as shown in FIG. 5, can be defined by the equation below.

$$y_W = x_W \tan \theta_W + b_W, \quad z_W = \text{const} \quad \text{(equation 1)}$$

$\theta_W$ is a parameter pertaining to the gait direction of a human that exists in world coordinates, which expresses real space. When an intercept $b_W$ can be found, the gait of a human occurring in world coordinates is on the straight line indicated by this equation. Note that it is also possible for the fragment extraction line 23 to use a curved line. For example, it is also valid to use a curved line which follows the fluctuation of the gait. In this case, through assuming the gait periodicity, the fragment extraction line is determined by a sin curve and so on, and by executing fragment extraction while shearing the phase, fragment extraction matching the periodic vertical movement occurring in the gait can be executed.

Furthermore, in the case where, for example, one wants to execute human detection based on the movement between the knee and the ankle, such detection is made possible by causing the fragment extraction line to have a thickness. In this case, the spatiotemporal fragment extracted from the spatiotemporal volume has a constant thickness. Additionally, the abovementioned $\theta_W$ and $b_W$ take on a combination which covers a surveillance area, and are determined, sequentially, by the verification results of the spatiotemporal fragment verification unit 16, mentioned later. Note that in the case where another detection method is employed, it is acceptable to determine the previously mentioned two parameters based on those detection results, and not to be exhaustive.

The case where another detection method is employed is described in the fourth and fifth embodiments.

Next, the coordinate transformation unit 31 transforms the fragment extraction line 23, which is generated from these parameters $\theta_W$ and $b_W$, from the world coordinate system to a pixel coordinate system, which expresses an image plane, using already-known parameters such as the installation position, focal distance, scale factor, and so on of the camera 10. Through this conversion, the fragment extraction line becomes a line in a two-dimensional image.

Next, the spatiotemporal volume cutting unit 32 executes extraction of the spatiotemporal fragment. This extraction of the spatiotemporal fragment is executed by cutting the spatiotemporal volume generated by the spatiotemporal volume generation unit 13 using the fragment extraction line occurring in the pixel coordinate system generated by the coordinate transformation unit 31.

Next, the spatiotemporal fragment verification unit 16 verifies the spatiotemporal fragment extracted by the spatiotemporal volume cutting unit 32 with the human body region movement model spatiotemporal fragment outputted from the human body region model spatiotemporal fragment output unit 15, and outputs a fragment extraction line parameter change signal, which is a signal indicating a parameter change in the fragment extraction line based on the verification results, to the fragment extraction line generation unit 30.

Thereafter, in the same manner, the spatiotemporal fragment extraction unit 14 creates the fragment extraction line and the spatiotemporal fragment until input of the fragment extraction line parameter change signal finishes.

Next, the human body region movement model spatiotemporal fragment output unit 15 is described in detail.

Figure 6:
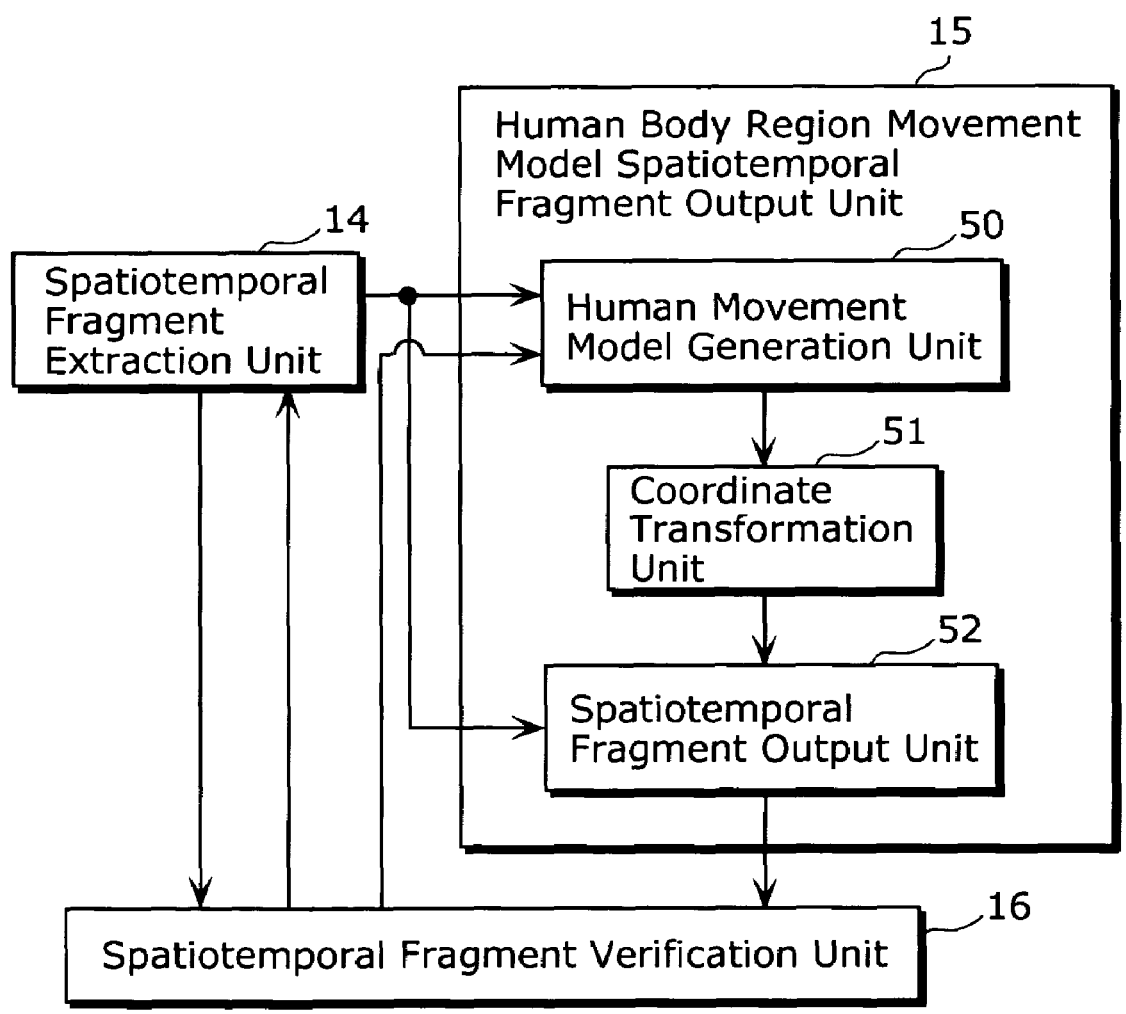
FIG. 6 is a function block diagram showing a configuration of a human body region movement spatiotemporal fragment output unit in the first embodiment of the present invention.

As shown in FIG. 6, the human body region movement model spatiotemporal fragment output unit 15 includes: a human movement model generation unit 50, which models the gait of a human in world coordinates using the fragment extraction line 23; a coordinate transformation unit 51, which executes conversion from the world coordinate system to the pixel coordinate system; and a spatiotemporal fragment output unit 52, which generates a spatiotemporal fragment in accordance with the human movement model.

In the present embodiment, an example in which the gait of a human is modeled using two line segments which represent legs is described. Note that it is also acceptable to use a finer model which takes into account knee joints, ankles, and so on. Furthermore, it is also possible to model the movement of the torso, head region, arms, and hands at the same time. Additionally, it is also acceptable to model the movement of the human using ellipses and the like instead of line segments.

Figure 7:
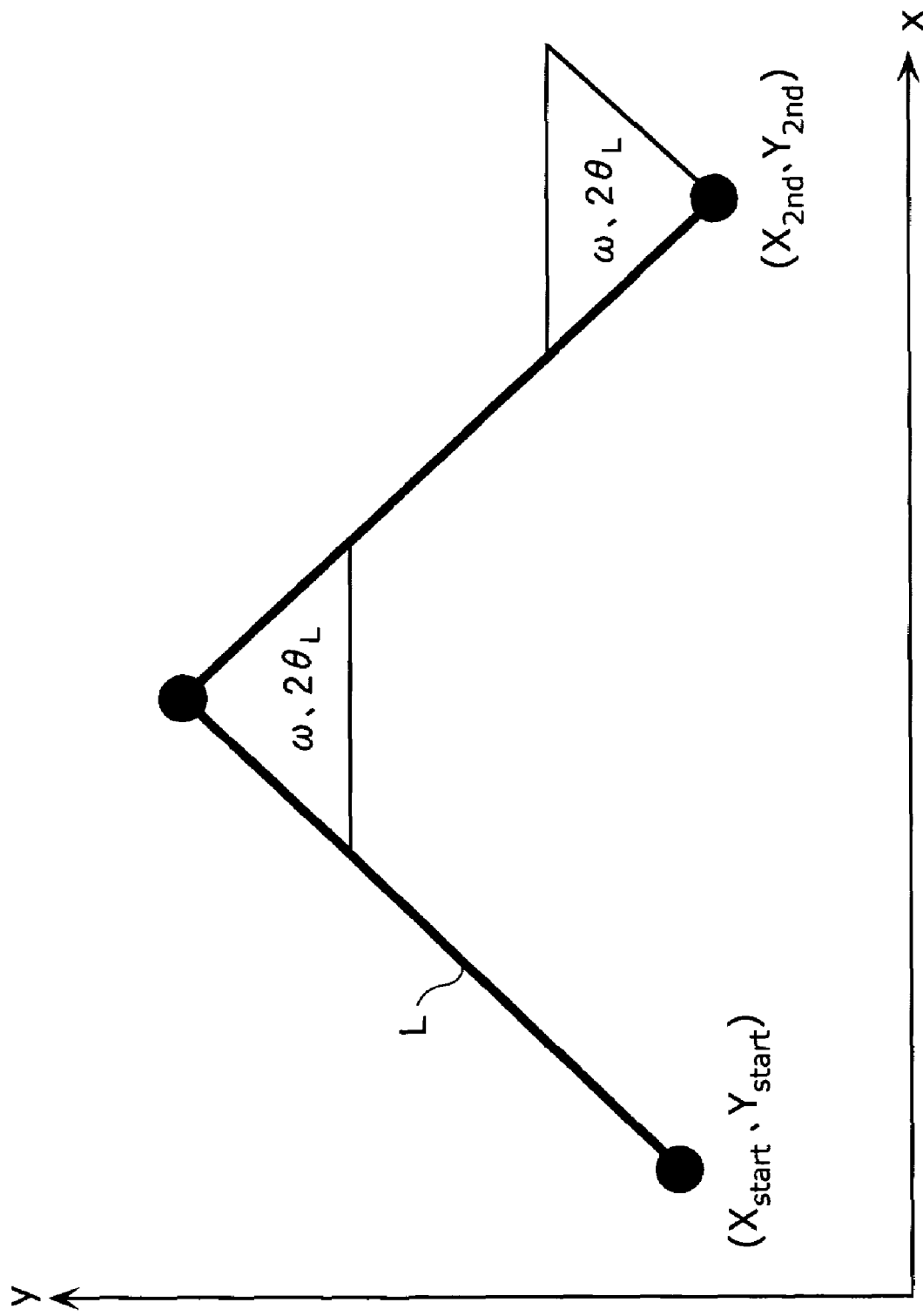
FIG. 7 is a diagram showing a human movement model in the first embodiment of the present invention.

First, as shown in FIG. 7, the human movement model generation unit 50 determines a position $(x_{start}, y_{start})$ where the human movement model walks in world coordinates and an angular rate $\omega$ using one step amount of the gait in the world coordinate system as a base unit. Here, the position $(x_{start}, y_{start})$ is one point on the fragment extraction line 23 which occurs in the world coordinates determined by the spatiotemporal fragment extraction unit 14.

Note that FIG. 7 indicates the case where the legs of the human movement model are opened to the maximum amount. Additionally, the next step has $(X_{2nd}, Y_{2nd})$ as a starting point and moves up to an angular rate $\omega$ and an angle $2\theta_L$.

A method for determining the position $(x_{start}, y_{start})$ on world coordinates, which are parameters pertaining to the human movement model, and the angular rate $\omega$, is now described.

The parameters $\theta_W$ and $b_W$ of the fragment extraction line determined by the fragment extraction line generation unit 30 are expressed as straight lines in world coordinates. Parameters inside the surveillance area are determined exhaustively based on a restriction that the position $(x_{start}, y_{start})$ in world coordinates, which is the parameters of the human movement model, is on a straight line in these world coordinates. Note that in the case where another detection method is employed, it is acceptable to determine the parameters pertaining to the position based on those detection results, and not to be exhaustive.

Next, an operation of the human movement model in the human movement model generation unit 50 is described. As shown in FIG. 7, the human movement model models the movement of the legs of a human. Two straight lines represent the legs, and one step amount of a gait is generated by causing the legs of the human movement model to move at the angular rate $\omega$, with the position $(x_{start}, y_{start})$ in world coordinates as the origin point. In the case where the angle of the groin area of the human movement model is $2\theta_L$, then $2\theta_L/\omega$ is the amount of times or number of frames required for one step of gait. Here, in regards to $\omega$, the possible angular rate $\omega$ is exhaustively attempted taking the gait speed into consideration, and therefore the human body region movement model spatiotemporal fragment of a combined part of the angular rate $\omega$ and the position $(x_{start}, y_{start})$ in world coordinates is generated. Note that in the present embodiment, the case where a designer has already determined a leg length L and a groin area angle $\theta_L$ is described. However, it is also possible to make the model more precise by causing these parameters to change according to a state and by preparing several types of human movement models. Of course, it is also acceptable for the gait generated by the human movement model to use several steps as the base unit, as opposed to one step.

Next, the coordinate transformation unit 51 uses already-known parameters such as the installation position, focal distance, scale factor, and so on of the camera 10 in the same manner as the coordinate transformation unit 31, and by transforming one step part of the human movement model in world coordinates generated by the human movement model to a gait in the pixel coordinate system, generates a spatiotemporal volume from the human movement model.

Next, the spatiotemporal fragment output unit 52 uses the parameters $\theta_W$ and $b_W$, the same as the spatiotemporal fragment extraction unit 14, to generate a spatiotemporal fragment for the spatiotemporal volume in the pixel coordinate system generated by the coordinate transformation unit 51.

Note that here, a spatiotemporal volume with the coordinate transformation unit 51 is generated using the human movement model generated in the human movement model generation unit 50, and a spatiotemporal fragment of the human movement model is generated from the spatiotemporal volume. However, it is also possible to generate a spatiotemporal fragment through focusing on a specific region of the human movement model and directly calculating the movement of the specific region. In this case, the human movement model models the movement of the legs, but the human body region movement model spatiotemporal fragment is generated as a fragment which is focused on one region of the legs, such as the ankle region. In this manner, by generating a human body region movement model spatiotemporal fragment through directly calculating the movement of a specific region, the calculation amount can be reduced, and by using the movement of a region unique to a human, human detection can be made easier.

Next, the spatiotemporal fragment verification unit 16 verifies between the spatiotemporal fragment extracted by the spatiotemporal fragment extraction unit 14 and the human body region movement model spatiotemporal fragment outputted from the human body region movement model spatiotemporal fragment output unit 15, and outputs a human body region movement model spatiotemporal fragment parameter change signal, which is a signal indicating a parameter change in the human body region movement model spatiotemporal fragment based on the verification results, to the human movement model generation unit 50.

Thereafter, in the same manner, the human body region movement model spatiotemporal fragment output unit 15 creates the human body region movement model spatiotemporal fragment from the human movement model until input of the human body region movement model spatiotemporal fragment parameter change signal finishes.

As above, the parameters of the human movement model are determined based on a restriction set by the parameters of the fragment extraction line. When the parameters of the human movement model are a first processing loop, and the parameters of the fragment extraction line are a second processing loop, the first loop is included in the second processing loop.

Figure 8:
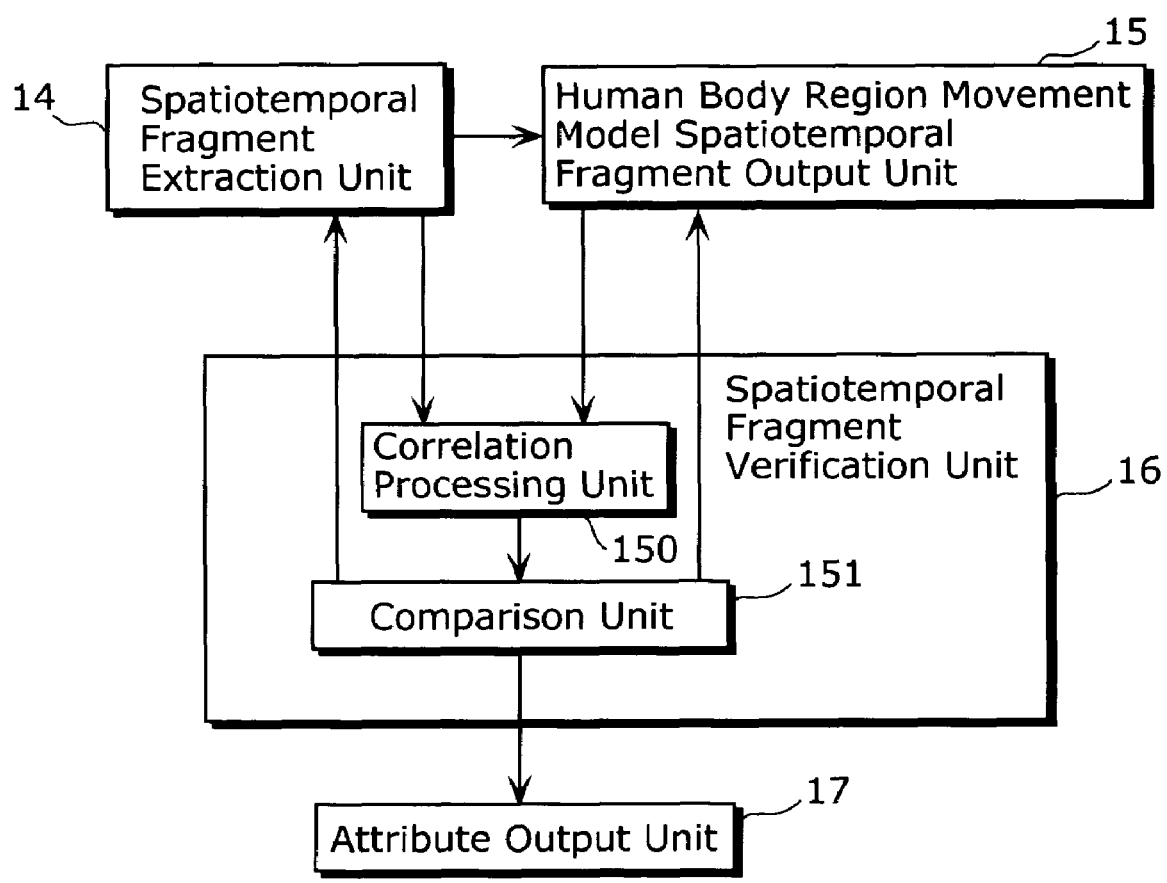
FIG. 8 is a function block diagram showing a configuration of a spatiotemporal fragment verification unit in the first embodiment of the present invention.

Next, the spatiotemporal fragment verification unit 16 is described using FIG. 8. The spatiotemporal fragment verification unit 16 includes: a verification processing unit 150, which verifies the spatiotemporal fragment extracted in the spatiotemporal fragment extraction unit 14 with the human body region movement model spatiotemporal fragment generated from the human movement model in the human body region movement model spatiotemporal fragment output unit 15; and a comparison unit 152, which retains the verification results, compares the results to a pre-determined threshold, and outputs the verification results or parameter change request.

The verification processing unit 150 verifies by executing matching with a spatiotemporal fragment extracted from a real image while scanning the human body region movement model spatiotemporal fragment generated from the human movement model in temporal direction. An example of verification of a binarized image is described below.

Figure 9A:
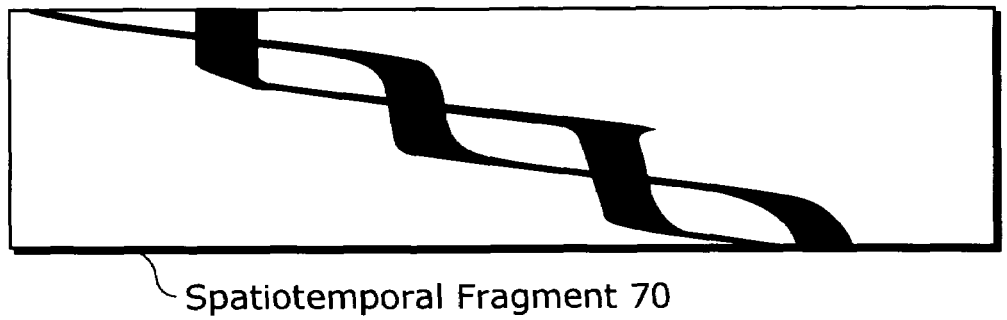
FIG. 9A is a diagram showing a spatiotemporal fragment in the first embodiment of the present invention.
Figure 9B:
FIG. 9B is a diagram showing a human body region movement model spatiotemporal fragment in the first embodiment of the present invention.

FIG. 9A is a spatiotemporal fragment 70, which focuses on the movement of the legs of a human extracted from a real image; FIG. 9B is a human body region movement spatiotemporal fragment 71, which is generated from the human movement model; and FIG. 9C indicates a matching score which is a verification score of both.

In the spatiotemporal fragment 70 extracted from the real image, the human body region movement model spatiotemporal fragment 71 generated from the human movement model is scanned from top to bottom one pixel at a time, and the matching score is calculated. Note that in the present embodiment, the process of calculating the matching score is referred to as a step.

Here, in the case where the spatiotemporal fragment 70 and the human body region movement model spatiotemporal fragment 71 is a binarized "0" or "1", a pixel with a pixel value of "1" is an ON pixel, and a pixel with a pixel value of "0" is an OFF pixel, and the matching score is the verification between the ON pixel and OFF pixel of the human body region movement model spatiotemporal fragment 71 and the ON pixel and OFF pixel of the spatiotemporal fragment 70.

First, the human body region movement model spatiotemporal fragment 71 is superimposed on an arbitrary place of the spatiotemporal fragment 70.

Next, the number of verifications of the ON pixel is calculated, in the case where the human body region movement model spatiotemporal fragment 71 is the ON pixel and the spatiotemporal fragment 70 is the ON pixel, with the human body region movement model spatiotemporal fragment as a criteria.

Next, the number of verifications of the OFF pixel is calculated, in the case where the human body region movement model spatiotemporal fragment 71 is the OFF pixel and the spatiotemporal fragment 70 is the OFF pixel, with the human body region movement model spatiotemporal fragment as a criteria.

Next, the matching score is found by adding a value in which the number of verifications of the ON pixel is normalized with the number of ON pixels of the human body region movement model 71 with a value in which the number of verifications of the OFF pixel is normalized with the number of OFF pixels of the human body region movement model 71.

Note that it is also possible to use another method as a method for calculating the matching score.

Figure 9C:
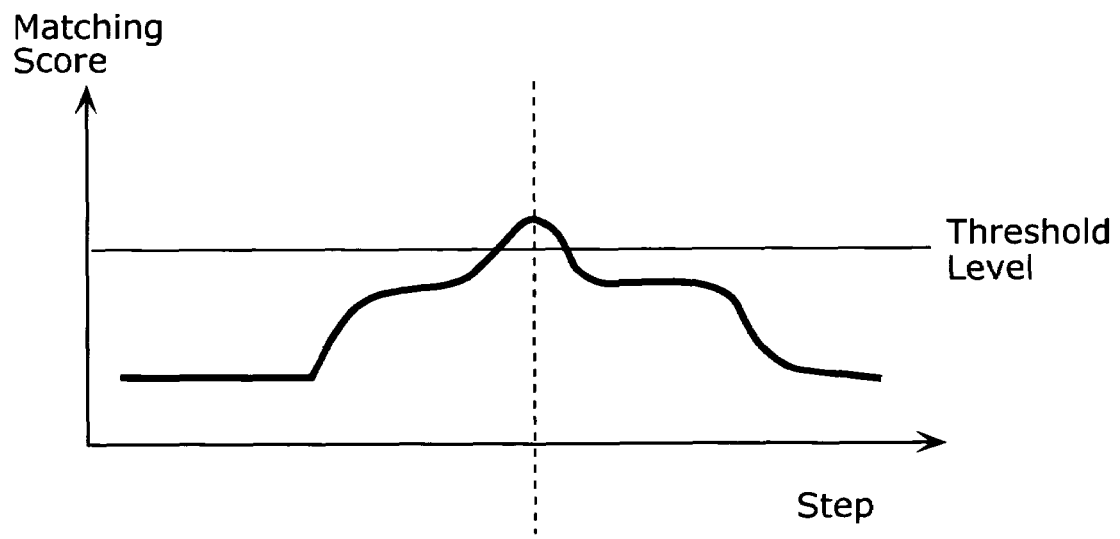
FIG. 9C is a diagram showing a matching in the first embodiment of the present invention.

As shown in the verification results in FIG. 9C, the matching score is calculated while scanning the human body region movement model spatiotemporal fragment in each step, and outputted to the comparison unit 151.

Next, the comparison unit 151 compares a score indicating the maximum matching score from the scan processing with a threshold value set in advance, and outputs a matching score that is equal to or above that threshold value, that number of steps, and the parameters of the human movement model to the attribute output unit 17 as the verification results. Note that here, only the score which indicates the maximum matching score is compared to the threshold value, but comparison with the threshold value in each step is also acceptable.

Furthermore, in the case where the matching score is less than the threshold value, and review of the parameters of all human movement models has not finished, the spatiotemporal fragment verification unit 16 outputs a human body region movement model spatiotemporal fragment parameter change signal, which finds a change in the parameters of the human body region movement model spatiotemporal fragment, to the human body region movement model spatiotemporal fragment output unit 15, and in the case where review of the parameters of all human movement models has finished, outputs the fragment extraction line parameter change signal, which finds a change in the parameters of the fragment extraction line, to the spatiotemporal fragment extraction unit 14.

Note that $\theta_W$ and $b_W$, which are the parameters of the fragment extraction line 23, and ($x_{start}$, $y_{start}$) and $\omega$, which are the parameters of the human movement model, are included in the human body region movement model spatiotemporal fragment parameter change signal and the fragment extraction line parameter change signal.

In addition, time in FIG. 9A is a number of frames N determined in advance in the spatiotemporal volume generation unit 13; time in FIG. 9B is $2\theta_L/\omega$ in the case where the groin area angle and angular rate of the human movement model generated by the human movement model generation unit 50 are $2\theta_L$ and $\omega$ respectively; and the step in FIG. 9C is the number of steps of the scan processing executed by the verification processing unit 150.

When the scan finishes, the parameters of the human movement model in the human body region movement model spatiotemporal fragment output unit 15 are changed based on the restriction in the fragment extraction line parameter, and a combination of the parameters pertaining to the human movement model is attempted. In order to obtain detection results with the highest precision, every combination of the parameters that cover the surveillance area is attempted, but in the case where detection results with suboptimal precision are acceptable, detection results through the threshold of the verification processing unit 150 are also possible. In addition, in the case where a human candidate area is calculable using another initial detection method, it is not necessary to attempt every combination of parameters that covers the surveillance area.

Next, the parameters of the fragment extraction line of the spatiotemporal fragment extraction unit 14 are changed again, and based on the restriction in the fragment extraction line, a combination of the parameters pertaining to the human movement model are again repeatedly attempted. Here as well, in order to obtain detection results with the highest precision, every combination of the parameters that cover the surveillance area is attempted, but in the case where detection results with a suboptimal precision are acceptable, detection results through the threshold of the verification processing unit 150 are also possible. In addition, in the case where a human candidate area is calculable using another initial detection method, it is not necessary to attempt every combination of parameters that cover the surveillance area.

Note that in the case where the fragment extraction line is caused to have a thickness, the extracted spatiotemporal fragment is a fragment that has a thickness. In this case, the human body region movement model spatiotemporal fragment also is, in the same manner, a fragment with a thickness. In this case, it is acceptable for the spatiotemporal fragment verification unit to verify among fragments that have a thickness, and it is also acceptable to execute verification among images in which the spatiotemporal fragment extracted from the spatiotemporal volume and the human body region movement model spatiotemporal fragment generated from the human movement model, respectively, are compressed into a single image.

Next, the parameters of the human movement model and the fragment extraction line 23 in world coordinates which have ultimately obtained a high matching score according to the overall search results of every combination of parameters covering the surveillance area, or the search results equal to or above the threshold in the verification processing unit 150, are designated as human detection results. However, in the case where the human candidate area is calculable using another initial detection method, it is not necessary to attempt every combination of parameters covering the surveillance area.

Next, the attribute output unit 17 uses the results of the parameter combinations outputted by the spatiotemporal fragment reference unit 16 to assume that the gait direction is the same after t seconds and that movement is at a constant angular rate the same as the time of detection, based on position, gait direction, and angular rate of the detected human, and calculates the position of existence of the human after t seconds.

Here, of the combination of parameters which obtain a high matching score, the fragment extraction line parameter $\theta_W$ corresponds to the gait direction in world coordinates, and the human movement model parameter $(x_{start}, y_{start})$ corresponds to the position of existence of the human. Additionally, the detection time is calculated from the number of steps of the scan processing executed by the verification processing unit 150 that are attached to the combination of parameters; specifically, the detection time can be calculated from the number of steps when a maximum matching score is indicated.

As the length L of the legs and the angle $\theta_L$ of the groin area of the human movement model are already known, the position of existence t seconds after detection is estimated from that pace length and the gait direction and angular rate of the human movement model. Note that this estimation value is the position of existence of a human in world coordinates.

Lastly, the display unit 18 arranges the position of existence and gait direction of the human detected by the spatiotemporal fragment verification unit 16 in a downward view diagram and displays the diagram.

Through this, it is possible to detect the time, position, and gait direction simultaneously. Note that the present method is not limited to a method for searching for parameters.

As above, according to the present embodiment, the position of existence and movement direction of a walking human can be detected, and human detection can be executed, without limiting the position and gait direction of the human.

Second Embodiment

Next, a human detection device according to the second embodiment of the present invention is described.

Figure 10:
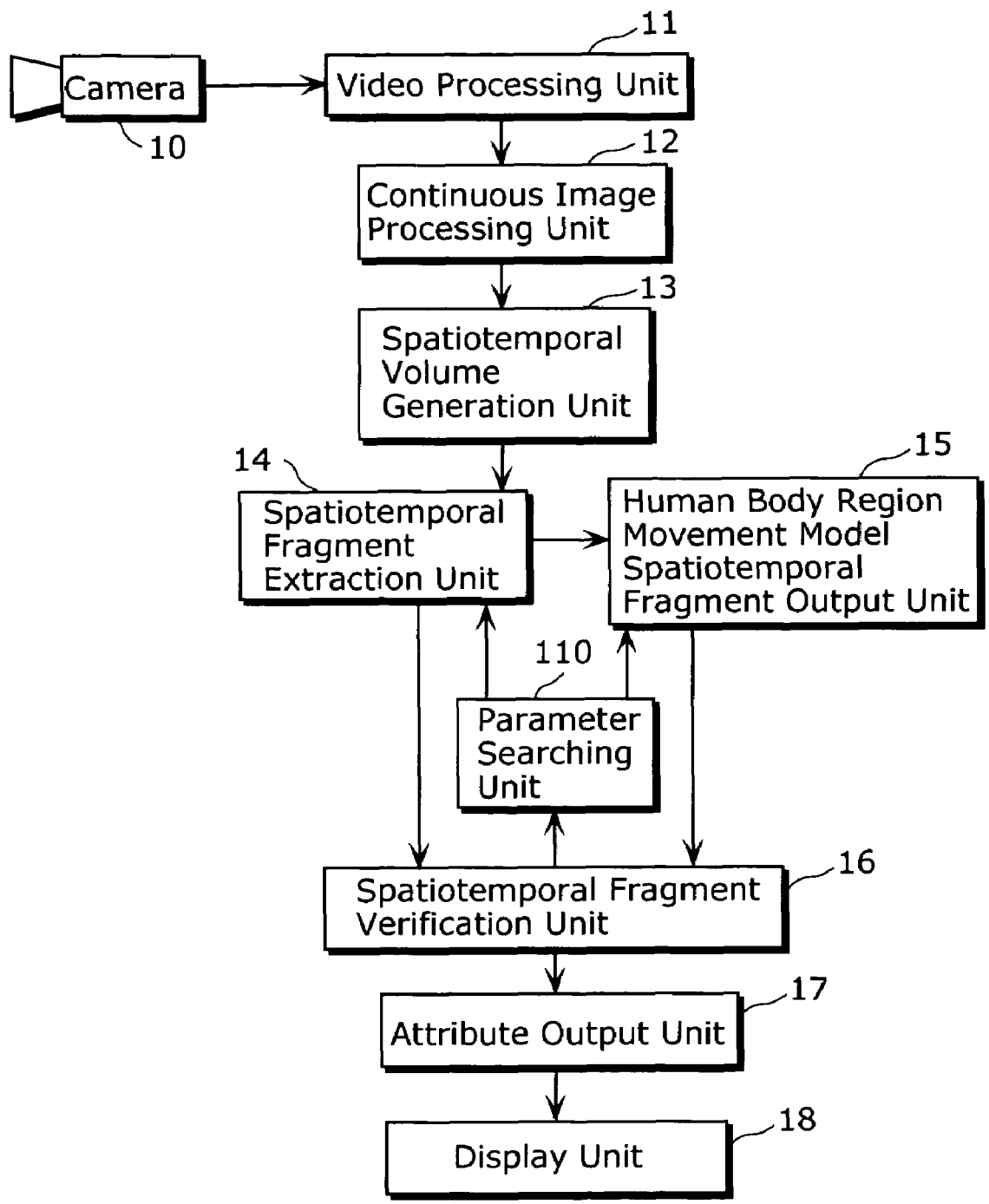
FIG. 10 is a function block diagram showing a configuration of a human detection device in the second embodiment of the present invention.

FIG. 10 is a function block diagram showing a configuration of a human detection device in the second embodiment of the present invention. This human detection device is, as in the first embodiment, a device which detects a human that exists within a video filmed on the street, in a parking lot, in a shop, and so on, but is able to verify a spatiotemporal fragment quickly compared to the first embodiment. The human detection device includes: a camera 10; a video processing unit 11; a continuous image processing unit 12; a spatiotemporal volume generation unit 13; a spatiotemporal fragment extraction unit 14; a human body region movement model spatiotemporal fragment output unit 15; a spatiotemporal fragment verification unit 16; an attribute output unit 17; a display unit 18; and a parameter searching unit 110. This configuration corresponds to the configuration of the human detection device in the first embodiment, but with the parameter searching unit 110 added. Description centered on the points that differ from the first embodiment is given below.

In the first embodiment, verification of the spatiotemporal fragment is executed through searching all of the fragment extraction line parameters and the human movement model parameters, or searching the parameters equal to or above the threshold value of the verification results, but in the present embodiment, high-speed verification of the spatiotemporal fragment is possible by setting the parameter searching unit 110, which determines the abovementioned parameters.

Below, an operation of the human detection device in the present embodiment is described. Note that as the camera 10, the video processing unit 11, the continuous image processing unit 12, the spatiotemporal volume generation unit 13, the spatiotemporal fragment extraction unit 14, the human body region movement model spatiotemporal fragment output unit 15, the spatiotemporal fragment verification unit 16, the attribute output unit 17, and the display unit 18 have the same operation as in the first embodiment, descriptions are omitted.

First, the spatiotemporal fragment verification unit 16 executes verification between a spatiotemporal fragment 70 and a human body region movement model spatiotemporal fragment 71, as in the first embodiment, and after verification, outputs parameters of a matching score, a number of steps, and a fragment extraction line and parameters of the human body region movement model spatiotemporal fragment to the parameter searching unit 110. Note that the verification method is the same as in the first embodiment.

Next, the parameter searching unit 110 uses a genetic algorithm, as written in Kitano, *Genetic Algorithm*, 1993: Sangyo Zusho, pp. 1-41, and searches for a suboptimal parameter set, and by outputting $\theta_W$ and $b_W$, which are parameters of a fragment extraction line 23, and ($x_{start}$, $y_{start}$) and ω, which are parameters of a human movement model, to a fragment extraction line generation unit 30, high-speed human detection is realized.

Figure 11:
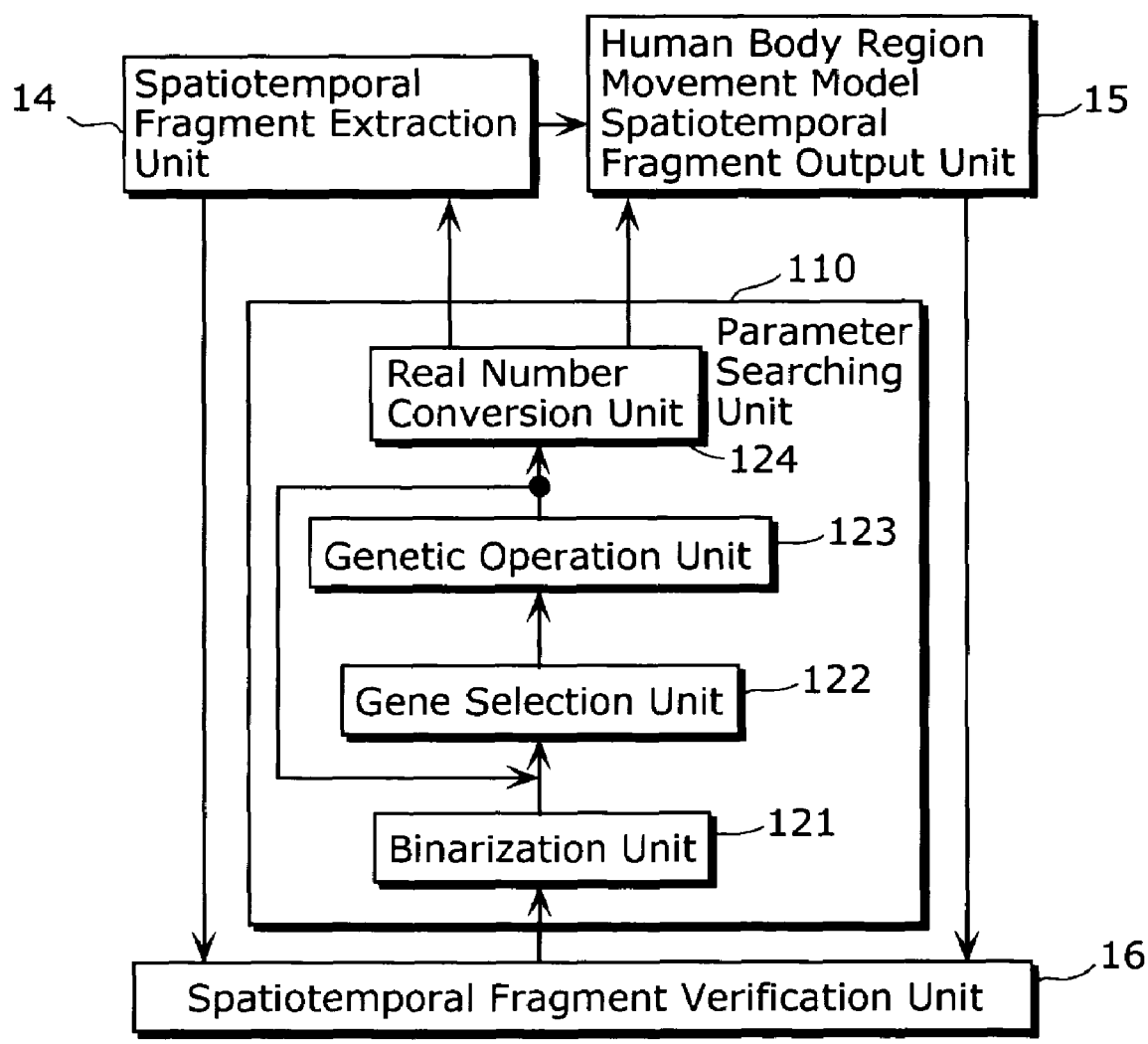
FIG. 11 is a function block diagram showing a configuration of a parameter searching unit in the second embodiment of the present invention.

FIG. 11 is a function block diagram showing a configuration of a parameter searching unit in the second embodiment of the present invention.

The parameter searching unit 110 includes: a binarization unit 121, which transforms parameters inputted from the spatiotemporal fragment verification unit 16, such as the matching score, into a bit string; a gene selection unit 122, which selects the bit string that executes a genetic operation out of a plurality of parameters converted to bit strings and strung together to form one bit string; a genetic operation unit 123, which uses a set of the selected bit strings, executes a genetic method such as a mutation or a crossover, and generates a new bit string; and a real number conversion unit 124, which converts the newly generated bit string back into a real number value.

The processing of the parameter searching unit 110 is described below.

First, the binarization unit 121 converts each of $\theta_W$ and $b_W$, which are the parameters of the fragment extraction line 23, and ($x_{start}$, $y_{start}$) and ω, which are the parameters of the human movement model, and which have been inputted from the spatiotemporal fragment verification unit 16, into bit strings, and strings together the bit strings to generate one bit string. Note that the conversion to bit strings is conversion from 10 base to 2 base.

Next, the gene selection unit 122 can determine an initial value of the bit string by selecting, at random, an initial value of the parameters inputted from the spatiotemporal fragment verification unit 16, and sorts the determined bit strings in order from the highest matching score.

Note that it is also valid to have the initial value be a result of executing an initial detection using another human initial detection method.

Next, the genetic operation unit 123 thinks of the bit string that has each parameter strung together as a gene, is more likely to select the bit string with a higher matching score value as a parent, and by executing a mutation and a crossover, obtains a bit string of a new parameter.

Here, the crossover, for example, creates a new bit string by determining, with random numbers, a converging bit position, called an crossover point, among two bit strings selected as a pair, and alternately interchanging the previous and next bit strings with the crossover point as a boundary. The mutation, for example, causes the bit string to change by determining, at random in a constant probability, a bit position that causes a mutation, and inverting the bit string. However, the bit string that expresses the human movement model parameter ($x_{start}$, $y_{start}$) uses a restriction condition of being on a straight line of the fragment extraction line parameters $\theta_W$ and $b_W$.

Note that the output results of the genetic operation unit 123 are outputted to the gene selection unit 122, and by repeating the genetic operation, efficient parameter searching is possible.

Next, the real number conversion unit 124 converts the bit string newly created by the genetic operation unit 123 into real number value parameters, and outputs the parameters as a fragment extraction line parameter change signal that includes each type of parameter to the spatiotemporal fragment extraction unit 14, and outputs the parameters as a human body region movement model spatiotemporal fragment parameter change signal that includes each type of parameter to the human body region movement model spatiotemporal fragment output unit 15.

Next, the spatiotemporal fragment extraction unit 14 determines the fragment extraction line 23 based on the fragment extraction line parameter change signal that includes the parameters inputted from the parameter searching unit 110, and extracts the spatiotemporal fragment. The human body region movement model spatiotemporal fragment output unit 15 generates the human movement model based on the human body region movement model spatiotemporal fragment parameter change signal that includes the parameters outputted from the parameter searching unit 110, and generates the human movement model spatiotemporal fragment. Each of the spatiotemporal fragment and the human movement model spatiotemporal fragment are outputted to the spatiotemporal fragment verification unit 16, and the spatiotemporal fragment verification unit 16 executes verification on them.

After the abovementioned parameter searching process is repeated a pre-set constant number of times, the parameters of the straight line which has obtained the maximum matching score and of the human movement model are the human detection results.

The subsequent processes are the same as those in the first embodiment and are therefore omitted here.

As described above, according to the present embodiment, faster human detection is possible by parameter searching the parameters of the fragment extraction line 23 and the parameters of the human movement model with a genetic algorithm, as compared to the case where spatiotemporal fragment verification is executed while searching all parameters.

Third Embodiment

Next, a human detection device in the third embodiment of the present invention is described.

Figure 12:
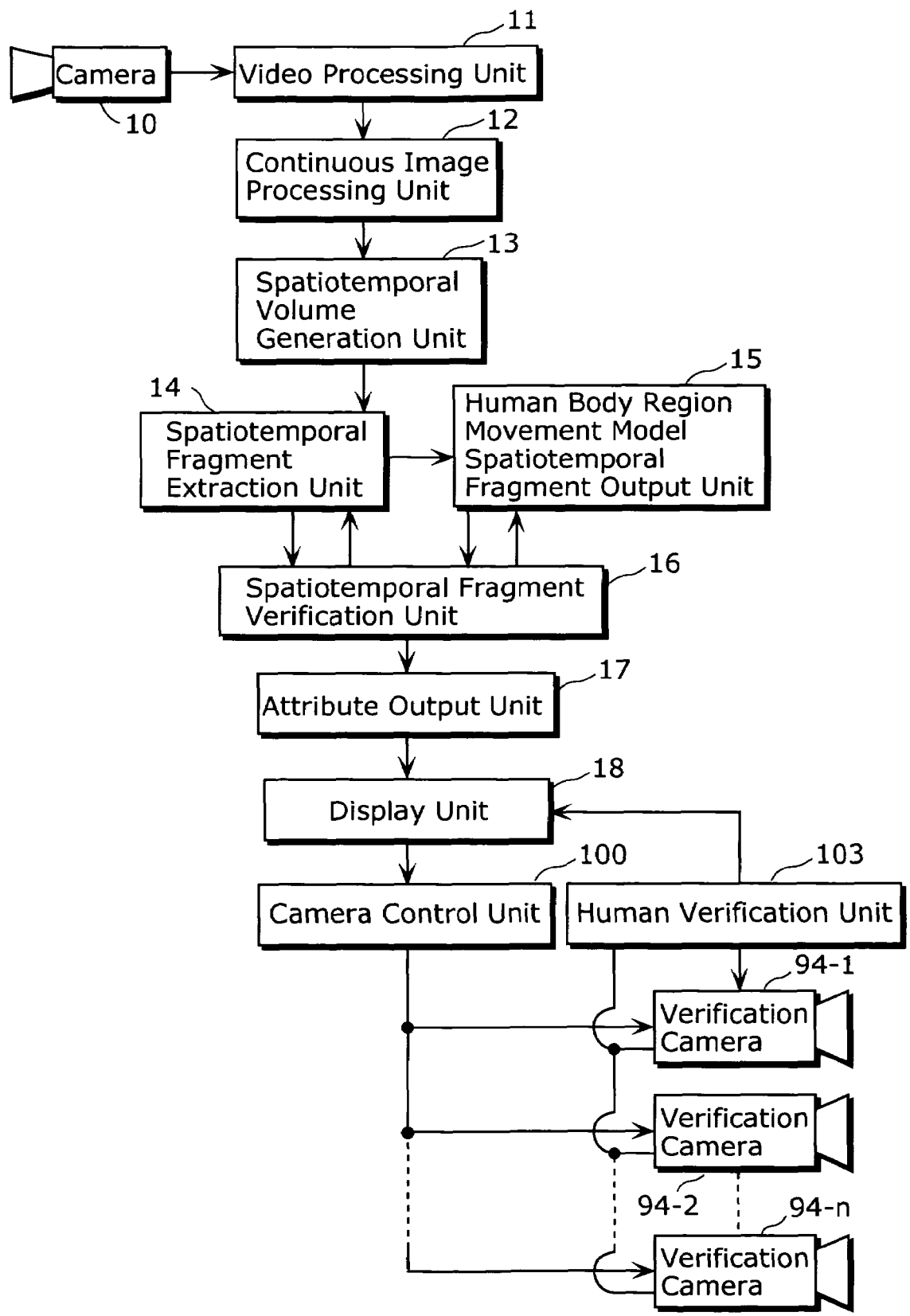
FIG. 12 is a function block diagram showing a configuration of a human detection device in the third embodiment of the present invention.

FIG. 12 is a function block diagram showing a configuration of a human detection device in the third embodiment of the present invention. This human detection device uses the human detection device of the first embodiment, and verifies a human by controlling a camera. The human detection device includes: a camera 10; a video processing unit 11; a continuous image processing unit 12; a spatiotemporal volume generation unit 13; a spatiotemporal fragment extraction unit 14; a human body region movement model spatiotemporal fragment output unit 15; a spatiotemporal fragment verification unit 16; an attribute output unit 17; a display unit 18; a camera control unit 100; a human verification unit 103; and verification cameras 94-1 to n. This configuration has added the camera control unit 100, the human verification unit 103, and the verification cameras 94-1 to n to the configuration of the human detection device in the first embodiment. Description centered on the points that differ from the first embodiment is given hereafter.

Note that the same effect can be obtained even when the human detection device used is the human detection device in the second to fifth embodiments.

The camera control unit 100 uses the results of the attribute output unit 17 and tracks an appropriate human. The verification cameras 94-1 to n have pan, tilt, and zoom functions, and record an installation position in world coordinates, a scope of mobility, and a scope of mobility for filming. The human verification unit 103 uses a video filmed by the verification cameras 94-1 to n and executes verification of a human.

The display unit 18 is a processing unit and display which displays a downward view diagram in which a detected human is laid out. The camera control unit 100 is a control unit which calculates the verification camera 94-1 to n which is closest to the position of a human 91-1 to n in the filmable world coordinates, and outputs a control signal which executes pan, tilt, and zoom to the verification camera 94-1 to n. The verification camera 94-1 to n is a filming device which executes pan, tilt, and zoom based on that control signal, and films a relevant human. The human identification unit 103 is a processing unit which executes verification of a human by comparing the filmed human with a pre-stored video.

In FIG. 13, a downward view diagram 90 indicating the display unit 18 and a status of human verification is shown. Here, the downward view diagram 90 is an area in which a human can be monitored, and humans 91-1 to n indicate the position and gait direction of the human. The downward view diagram 90 displays the position of a the detected human by creating, in advance, a position and corresponding relationship in world coordinates, which express real space.

Here, the case where verification of the humans 91-1 to n is executed is described. Note that it is acceptable for the human to be verified to be sequentially selected by the camera control unit 100, as well as selected at the discretion of a surveillant.

Below, an operation of the human verification device is described in detail.

First, the attribute output unit 17 causes a human 91-1 to be displayed in a monitor by outputting human information, which includes an estimated position of the human and a movement direction detected by the spatiotemporal fragment verification unit 16, to the display unit 18, as well as outputting human information that indicates the position and movement direction of the human 91-1 to the camera control unit 100.

Next, the camera control unit 100 selects a verification camera 94-1, which is optimal based on the human information outputted form the attribute output unit 17, and, using the human information, outputs a camera control signal which has determined the optimal control variables of pan, tilt, and zoom, to the verification camera 94-1. By operating in accordance to the camera control signal, the verification camera 94-1 films the human to be tracked, and in the downward view diagram 90 of the display unit 18, highlights the display of the human 91-1.

Next, the verification camera 94-1 films the human 91-1 based on the camera control signal, and outputs the filmed image to the human verification unit 103.

Next, as indicated in the display example in FIG. 13, the human verification unit 103 compares an image 95 that was filmed with a pre-recorded image 96 for verification, and executes verification. Here, in the case where a verification result 97 is a match, verification processing ends. In the case where the verification result 97 is not a match, the attribute output unit 17 selects a human 91-2, which is next to be verified, and outputs the human information to the camera control unit 100. The same processing is thereafter repeated until the verification result 97 is a match or all humans to be verified are selected.

Note that it is acceptable to have a plurality of verification cameras 94 selected by the camera control unit 100. Additionally, it is acceptable for the image used in verification to be selected from images filmed by the plurality of cameras 94. Through this, verification precision can be enhanced.

In particular, in the case where facial identification/recognition is executed, it is possible to film a frontal facial image through the camera control unit 100 determining a camera able to film a human from the position of existence of the human as well as assuming the scope of mobility, and controlling the camera in the direction most in-line with the detected gait direction, using the detected gait direction. Through this, it is possible to provide a more detailed facial image, as well as enhancing the dependability of facial identification/recognition in the case where automatic facial identification/recognition is executed.

As mentioned above, according to the present embodiment, by detecting the position of existence and gait direction of a human and controlling the camera based on those results, a more precise image of a human can be filmed.

Fourth Embodiment

Next, a human detection device in the fourth embodiment of the present invention is described.

Figure 14:
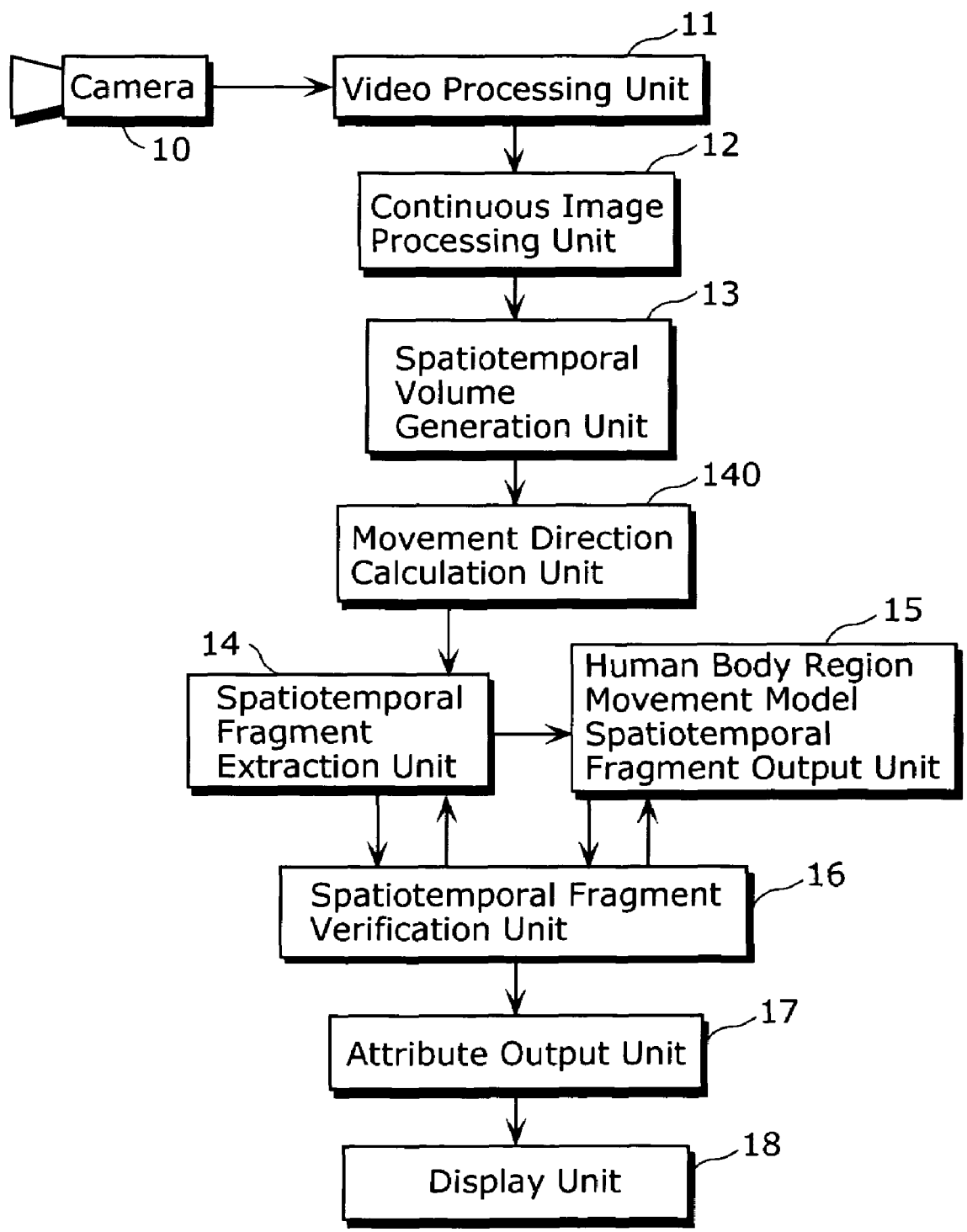
FIG. 14 is a function block diagram showing a configuration of a human detection device in the fourth embodiment of the present invention.

FIG. 14 is a function block diagram showing a configuration of a human detection device in the fourth embodiment of the present invention. This human detection device is, as in the first to third embodiments, a device which detects a human that exists within a video filmed on the street, in a parking lot, in a shop, and so on, but has the characteristic of calculating the movement direction of a moving body and, in accordance with the calculated direction, determines a fragment extraction line. The human detection device includes: a camera 10; a video processing unit 11; a continuous image processing unit 12; a spatiotemporal volume generation unit 13; a spatiotemporal fragment extraction unit 14; a human body region movement model spatiotemporal fragment output unit 15; a spatiotemporal fragment verification unit 16; an attribute output unit 17; a display unit 18; and a movement direction calculating unit 140. This configuration has added the movement direction calculating unit 140 to the configuration of the human detection device in the first embodiment. Description centered on the points that differ from the first embodiment is given below.

In the first embodiment, verification of a spatiotemporal fragment is executed by searching all of the fragment extraction line parameters and the human movement model parameters, or by searching the parameters equal to or above the threshold value of the verification results, but in the present embodiment, by setting the movement direction calculating unit 140 which calculates the movement direction of a moving body, high-speed spatiotemporal fragment verification is possible, and more accurate human detection is possible.

Below, an operation of the human detection device in the present embodiment is described. Note that as the camera 10, the video processing unit 11, the continuous image processing unit 12, the spatiotemporal volume generation unit 13, the spatiotemporal fragment extraction unit 14, the human body region movement model spatiotemporal fragment output unit 15, and the spatiotemporal fragment verification unit 16 have the same operation as in the first embodiment, descriptions are omitted.

First, the movement direction calculating unit 140, which calculates the movement direction of an object in an image from a spatiotemporal volume generated by the spatiotemporal volume generation unit 13, is described.

In methods for calculating the movement direction, there is a method in which a target object candidate is detected and the movement direction is calculated, and a method in which the movement direction is detected without executing detection of the target object.

Figure 15A:
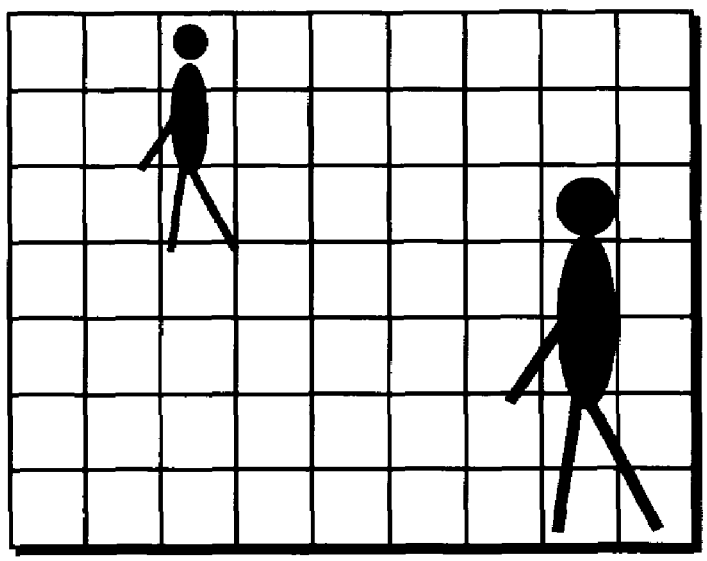
FIGS. 15A and 15B are diagrams showing an example of a movement direction calculation method in the fourth embodiment of the present invention.
Figure 15B:
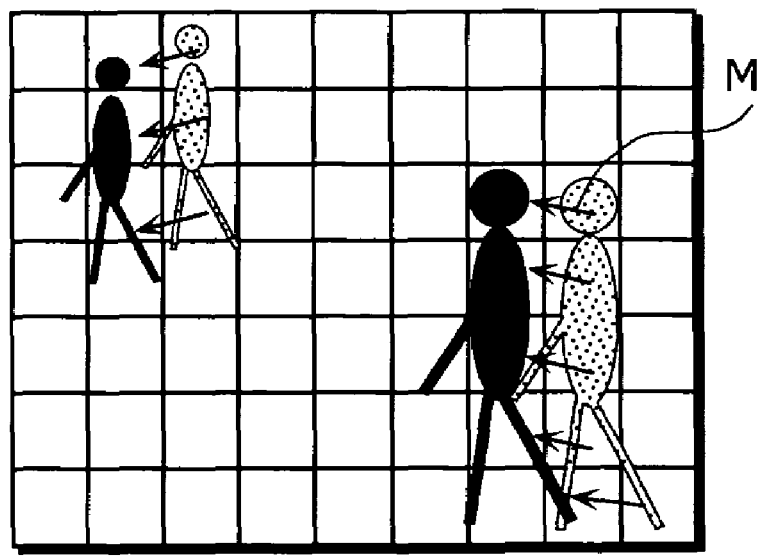

First, the method in which a target object candidate is detected and the movement direction is calculated is described. As shown in FIG. 15 (a), using a labeling algorithm which detects an isolated object from one differential image, the isolated object is captured as a target object candidate for detection.

Object detection with the labeling algorithm is executed by connecting pixels of a pixel value 1, and attaching a differing label to a differing connected section. In the present embodiment, this is carried out as described below.

First, in a binarized differential image occurring in time t, a pixel P, which has a pixel value 1 and no label attached, is detected, and a label L is attached. The label L is attached to all pixels joined to the pixel P. Object detection is executed by continuing this process until no pixels without labels attached exist. Of course, using another labeling method is acceptable as long as it is a method in which an isolated object can be detected.

Next, as shown in FIG. 15 (b), in a binarized differential image occurring in time t+1, by causing the moving object candidate labeled in time t to be perturbed in the image while executing matching, a motion vector reaching as far as the position with the highest matching value is calculated. This motion vector calculation processing is executed for a constant time, and by finding an average motion vector on a per-label basis, the movement direction of the target object candidate is calculated.

Figure 16A:
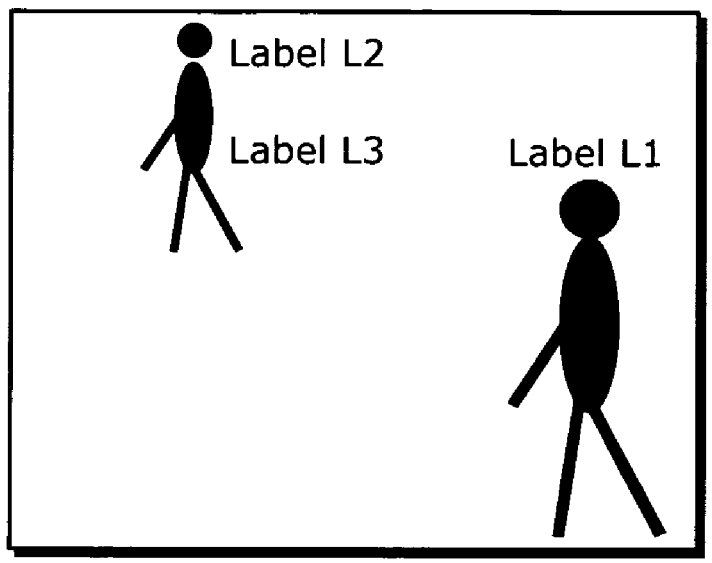
FIGS. 16A and 16B are diagrams showing an example of a movement direction calculation method in the fourth embodiment of the present invention.
Figure 16B:
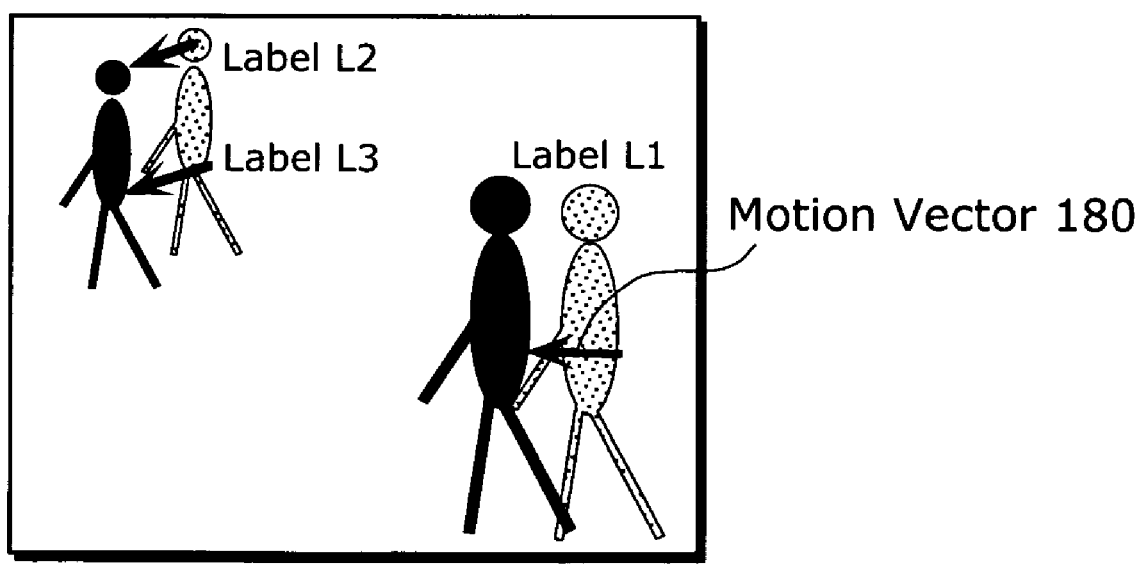

Next, the method in which the movement direction is detected without executing detection of the target object is described. Here, as shown in FIG. 16 (a), a calculation method in which subregions are marked off, is described.

Note that no limit is placed on how the subregions are marked off.

First, in the case where a pixel of a pixel value 1 exceeding a constant number in each subregion exists, by causing that subregion to be perturbed, matching between a binarized differential image occurring in time t and a binarized differential image occurring in time t+1 is executed. At this time, the motion vector reaching as far as the position which has the maximum matching value is calculated, as a result of causing perturbation from the present position. Through this, as shown in FIG. 16 (b), a motion vector is calculated in each subregion. This motion vector calculation processing is executed for a constant time, and an average motion vector of each subregion is found. Then, the average motion vector calculated in each subregion is voted on, and in the case where a vote exceeding a constant value is obtained, that vector the movement direction of the target object candidate.

Note that in the present embodiment, the abovementioned movement direction calculation method is described, but another object detection method may be used as long as the method can calculate the motion vector.

Hereafter, the case where the spatiotemporal fragment extraction unit 14 generates the fragment extraction line 23 as a straight line is described.

Figure 17:
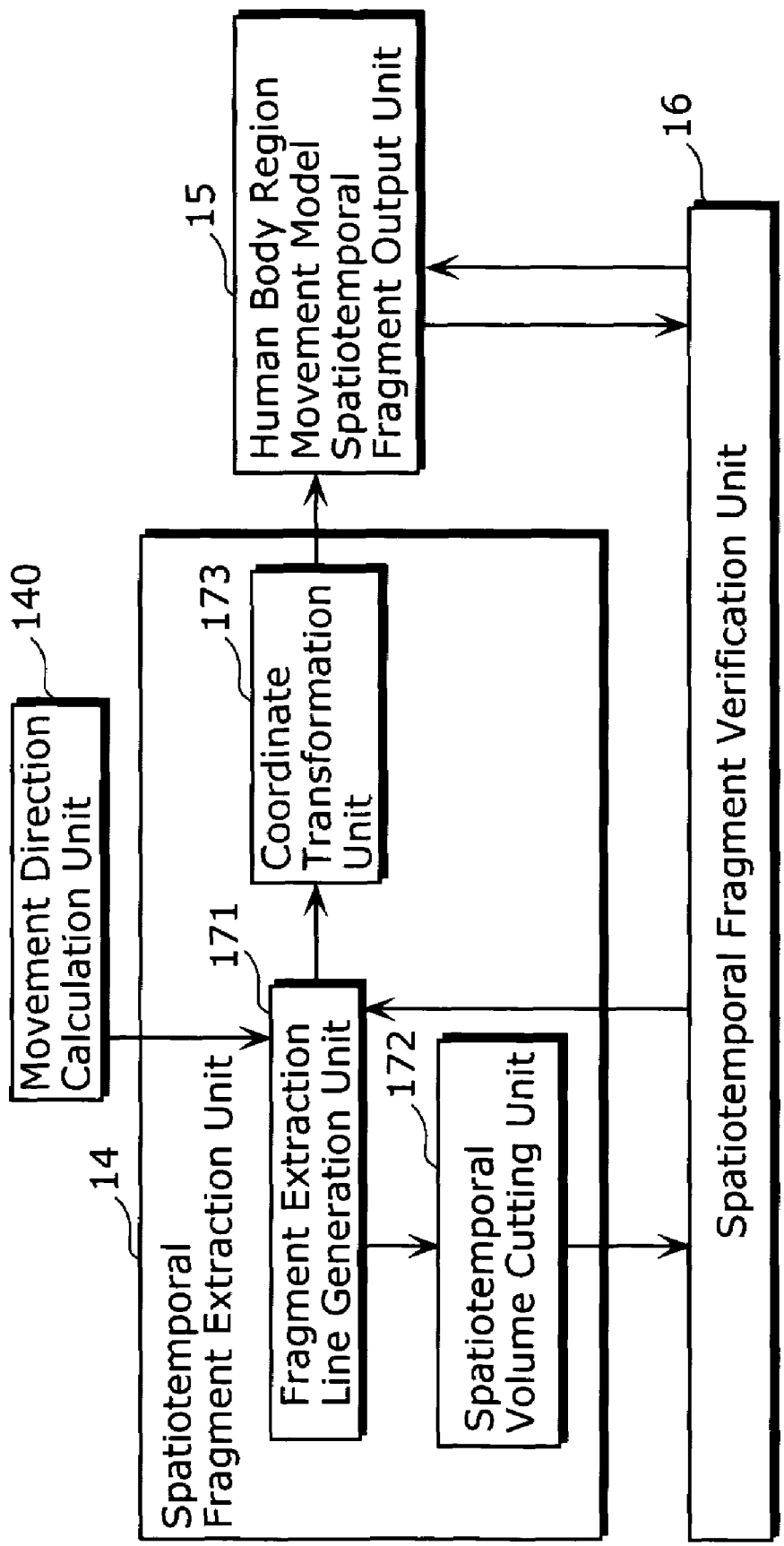
FIG. 17 is a function block diagram showing a configuration of a spatiotemporal fragment extraction unit in the fourth embodiment of the present invention.

As shown in FIG. 17, the spatiotemporal fragment extraction unit 14 includes: a fragment extraction line generation unit 171, which generates the fragment extraction line; a spatiotemporal volume cutting unit, which extracts the spatiotemporal fragment; and a coordinate transformation unit, which transforms a straight line and curved line parameter in an image into a straight line or curved line in world coordinates.

Here, the fragment extraction line generation unit is described. First, the straight line and curved line in an image are defined. Here, the case where the fragment extraction line 23 is found by drawing a straight line on an image is described.

The fragment extraction line 23 can be defined by the following equation.

$$Y_i = aX_i + b \qquad \text{(equation 2)}$$

Here, a gradient a is parameters pertaining to the movement direction of a moving object in an image, and b is an intercept in the image.

The gradient a can be found from the movement direction of the target object candidate calculated by the movement direction calculating unit 140. The fragment extraction line 23 is generated through changing the value of the intercept b in accordance with this gradient a, and in the spatiotemporal volume cutting unit 172, the spatiotemporal fragment 22 can be extracted. The extracted spatiotemporal fragment 22 is sent to the spatiotemporal fragment verification unit 16.

Next, the coordinate transformation unit 173 transforms the straight line in the image, which was generated by the fragment extraction line generation unit 171, into a straight line in world coordinates. As the human body region movement model spatiotemporal fragment output unit 15 generates a human movement model in accordance with the straight line in world coordinates as transformed here, the operations thereafter are the same as in the first embodiment.

Next, as in the first embodiment, the spatiotemporal fragment verification unit 16, executes verification between a spatiotemporal fragment 70 and a human body region movement model spatiotemporal fragment 71, and outputs a fragment extraction line parameter change signal, which is a signal indicating parameters change of the fragment extraction line based on the verification results, to the fragment extraction line generation unit 171.

Thereafter, in the same manner, the spatiotemporal fragment extraction unit 14 creates the spatiotemporal fragment in accordance with the parameters from the spatiotemporal data until input of the fragment extraction line parameter change signal finishes. Here, it is acceptable for the fragment extraction line parameter change signal to, based on the movement direction of the moving object candidate as calculated by the movement direction calculating unit, execute a parameter change on all parameter candidates as well as until moving object detection is executed in the attribute output unit 17.

Note that the fragment extraction line parameter change signal is a and b which are fragment extraction line parameters.

Subsequent processing is the same as in the first embodiment, and therefore discussions are omitted here.

As described above, according to the present embodiment, by calculating the movement direction of a moving object, the parameters of the fragment extraction line 23 and the parameters of the human movement model can be reduced, and faster human detection, as compared to the case where spatiotemporal fragment verification is executed while searching all parameters, is possible.

Fifth Embodiment

Next, a human detection device in the fifth embodiment of the present invention is described.

Figure 18:
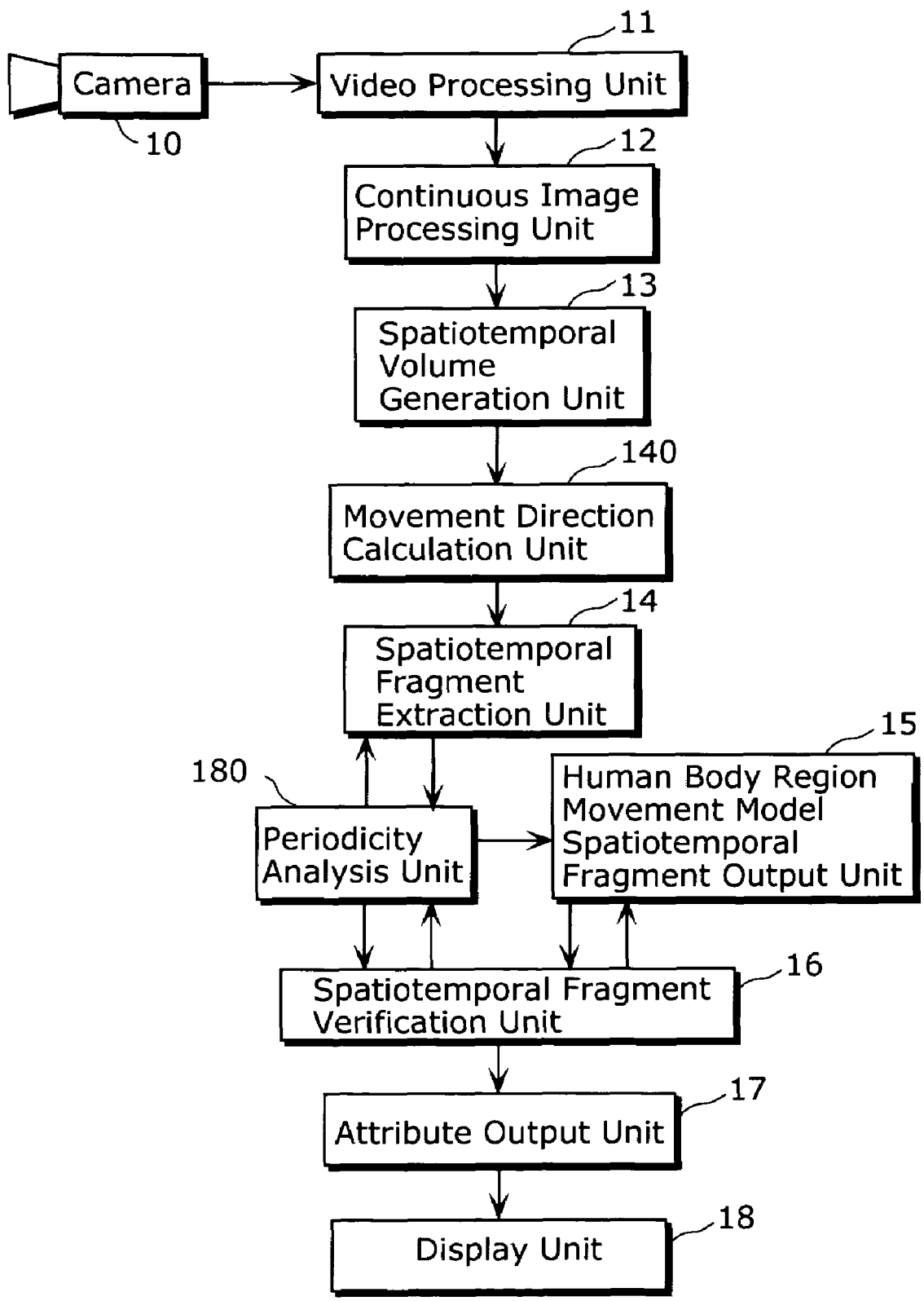
FIG. 18 is a function block diagram showing a configuration of a human detection device in the fifth embodiment of the present invention.

FIG. 18 is a function block diagram showing a configuration of a human detection device in the fifth embodiment of the present invention. This human detection device is, as in the first to fourth embodiments, a device which detects a human that exists within a video filmed on the street, in a parking lot, in a shop, and so on, but has the characteristic of calculating the movement direction of a moving body as well as determining a fragment extraction line while testing a periodic movement unique to gait. The human detection device includes: a camera 10; a video processing unit 11; a continuous image processing unit 12; a spatiotemporal volume generation unit 13; a spatiotemporal fragment extraction unit 14; a human body region movement model spatiotemporal fragment output unit 15; a spatiotemporal fragment verification unit 16; an attribute output unit 17; a display unit 18; a movement direction calculating unit 140; and a periodicity analysis unit 190. In other words, this configuration has added the periodicity analysis unit 190 to the configuration in the fourth embodiment. Description centered on the points that differ from the first and fourth embodiments is given below.

In the first embodiment, verification of a spatiotemporal fragment is executed by searching all of the fragment extraction line parameters and the human movement model parameters, or by searching the parameters equal to or above the threshold value of the verification results, but in the present embodiment, by setting the movement direction calculation unit 140, which calculates the movement direction of a moving object, and further setting the periodicity analysis unit 190, which tests the periodic movement unique to gait, high-speed verification of the spatiotemporal fragment is possible, and more accurate human detection is possible.

An operation of the human detection device in the present embodiment is described below. Note that as the camera 10, the video processing unit 11, the continuous image processing unit 12, the spatiotemporal volume generation unit 13, the spatiotemporal fragment extraction unit 14, the human body region movement model spatiotemporal fragment output unit 15, the spatiotemporal fragment verification unit 16, and the movement direction calculation unit 140 have the same operation as in the first and fourth embodiments, descriptions are omitted.

First, the case where the spatiotemporal fragment extraction unit 14 has generated a fragment extraction line 23 as a straight line is described.

In the present embodiment, the spatiotemporal fragment extraction unit 14 defines a straight line and a curved line in an image, based on the movement direction calculated by the movement direction calculation unit 140. Here, the case where the fragment extraction line is found by drawing a straight line on an image is described.

The fragment extraction line 23 can be defined by the following equation 3:

$$Y_i = aX_i + b \quad \text{(equation 3)}$$

Here, a gradient a is parameters pertaining to the movement direction of a moving object in an image, and b is an intercept in the image.

The gradient a can be found from the movement direction of the target object candidate calculated by the movement direction calculating unit 140. The fragment extraction line 23 is generated through changing the value of the intercept b in accordance with this gradient a, and the spatiotemporal fragment 22 can be extracted. The extracted spatiotemporal fragment 22 and the parameters of the fragment extraction line 23 are sent to the periodicity analysis unit 190.

Figure 19:
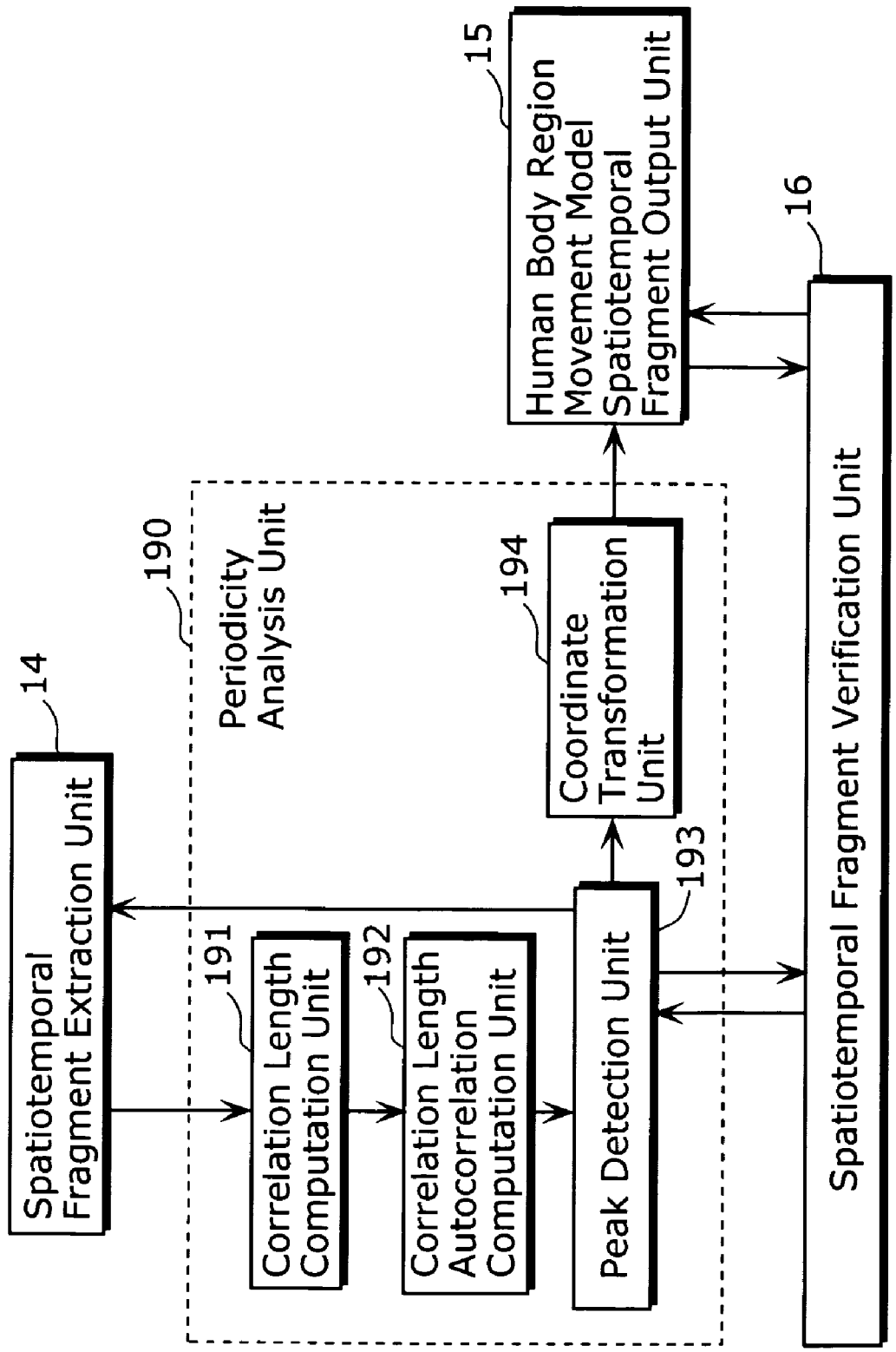
FIG. 19 is a function block diagram showing a configuration of a periodicity analysis unit in the fifth embodiment of the present invention.

As shown in FIG. 19, the periodicity analysis unit 190 includes: a correlation length computing unit 191, which computes an autocorrelation function on a per-time t basis for the spatiotemporal fragment, and computes each correlation length; a correlation length autocorrelation computing unit 192, which re-calculates the autocorrelation function for a correlation length time series, in which each calculated correlation length is arranged in temporal direction; a peak detection unit 193, which detects a peak position from the autocorrelation function of the correlation length inputted from the correlation length autocorrelation computing unit 192, and by testing whether or not the detected peak position matches with a movement period of the moving object, evaluates whether or not an object is a moving object; and a coordinate transformation unit 194, which transforms, when a peak is detected by the peak detection unit 193, a straight line in the image into a straight line in world coordinates.

The periodicity analysis unit 190 executes of the periodicity of the spatiotemporal fragment 22, and when that periodicity analysis finishes, outputs a fragment extraction line parameter change signal, which is a signal that indicates a change in the parameters of the fragment extraction line 23, to the spatiotemporal fragment output unit 14.

Thereafter, in the same manner, the spatiotemporal fragment extraction unit 14 creates the fragment extraction line 23, and creates the spatiotemporal fragment 22, until input of the fragment extraction line parameter change signal finishes.

Next, the correlation length computation unit 191 is described. For a spatiotemporal fragment 201 as shown in FIG. 20A, the correlation length computation unit 191 creates a one-dimensional data 202 on a per-time t basis, as shown in FIG. 20B, and computes an autocorrelation function 203 for each of the one-dimensional data 202.

Note that time in FIG. 20A is a frame number N pre-set by the spatiotemporal volume generation unit 13. Length in FIG. 20B is a width X of the spatiotemporal fragment 201 shown in FIG. 20A. The computation of the autocorrelation function 203 can be defined by the following equation 4.

$$c(\tau) = \lim_{X \to \infty} \frac{1}{X} \int_{-\frac{X}{2}}^{\frac{X}{2}} f(x) f(x + \tau) dx \quad \text{(equation 4)}$$

Here, f(x) is the one-dimensional data, and C(τ) is the autocorrelation function 203. In other words, the autocorrelation function C(τ) is a scale indicating how much the one dimensional data f(x) resembles (f(x+τ)), in the case where the one-dimensional data f(x) is sheared only an interval τ. FIG. 20C shows a relationship between the autocorrelation function C(τ) and τ. The autocorrelation function C(0) takes on a maximum value to indicate a verification with itself. Additionally, an autocorrelation function $C(\tau_p)$ is a position $\tau_p$ when the autocorrelation function C(τ) peaks, and a scale of an ON pixel with a high verification in the one-dimensional data. In the case where the legs of a moving object are focused on, the position $\tau_p$ in which a peak exists in the autocorrelation function C(τ) indicates the pace length. In other words, the temporal change of the autocorrelation function C(τ) indicates a temporal change in the pace length of movement, and can be expected to be periodic.

Note that FIG. 20D, 20E, and 20F are spatiotemporal fragment data examples obtained in the case where a gait characteristic (periodicity) does not exist, for example, a case where the fragment extraction line is set in a position that crosses the torso of a human, and are graphs that respectively show: i) the spatiotemporal fragment; ii) the example of one-dimensional data occurring in a time in the spatiotemporal fragment; and iii) the relationship between the period τ respectively and the autocorrelation function C(τ), and correspond to FIGS. 20A, 20B, and 20C, which indicate the case where the characteristic of gait exists. As shown in FIG. 20F, in the case where periodicity does not exist in the spatiotemporal fragment, a peak does not exist in the graph of the autocorrelation function C(τ).

The present embodiment assumes there are cases where a peak such as the autocorrelation function $C(\tau_p)$ does not necessarily exist, and where analysis of the periodicity is executed using a position $\tau_L$ when the autocorrelation function $C(\tau)=0$. This occurs when the legs are in a closed state. Additionally, this $\tau_L$ is hereafter called a correlation length. Note that in the present embodiment, the position $\tau_L$ when the autocorrelation function $C(\tau)=0$ is the correlation length, but anything is acceptable as long as it can capture the periodicity change in the pace length, and does not necessarily have to be a position $\tau_L$ when the autocorrelation function $C(\tau)=0$.

Figure 21A:
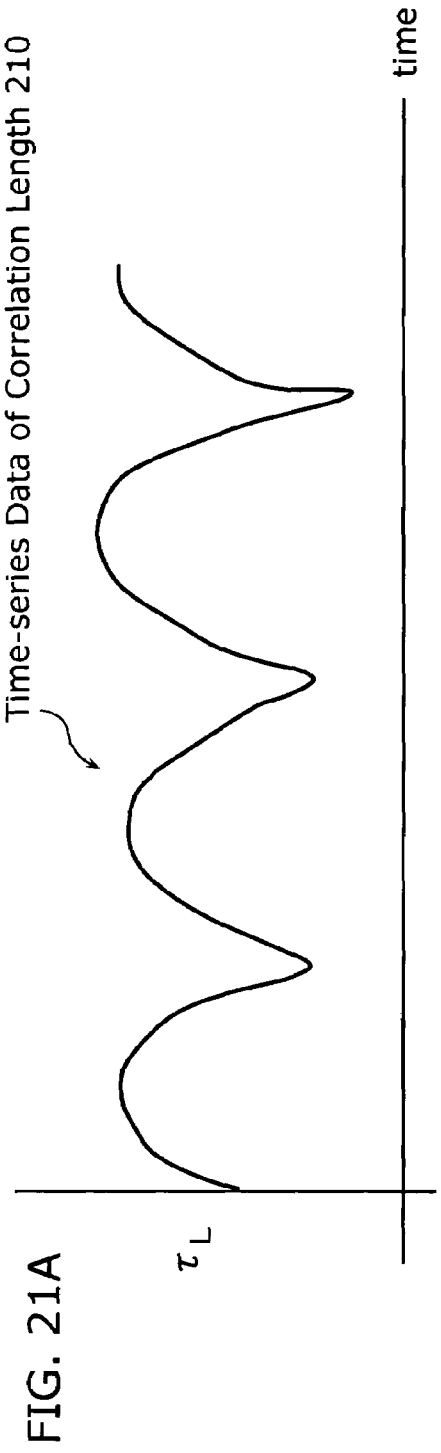
FIGS. 21A and 21B are diagrams showing an example of an autocorrelation function of a correlation length in the fifth embodiment of the present invention.

The correlation length $\tau_L$ is calculated on a per-time basis, and by arranging the correlation lengths $\tau_L$ calculated on a per-time basis in time order, a time series data 210 of the correlation length is obtained. The time series data 210 of the correlation length $\tau_L$ is shown in FIG. 21A. In the case where an ideal spatiotemporal fragment is inputted, the time series data 210 of the correlation length $\tau_L$ corresponds to the temporal change in the pace length, and periodically fluctuates according to the time.

Figure 21B:
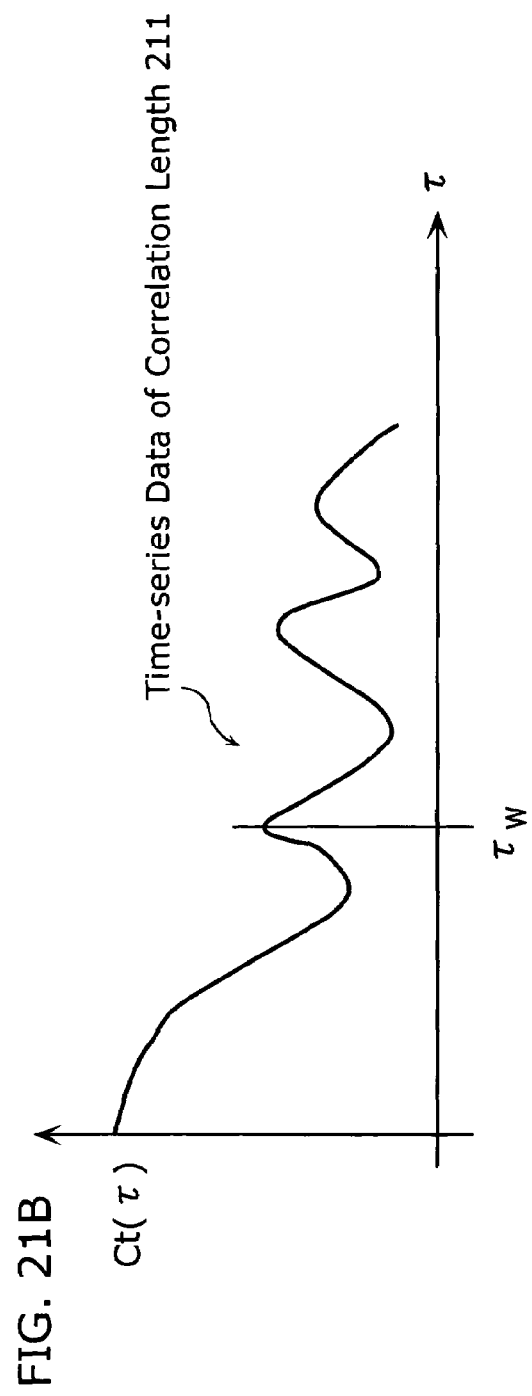

Next, the correlation length autocorrelation computing unit 192 is described in detail. The correlation length computing unit 191 outputs the time series data 210 of the correlation length $\tau_L$ to the correlation length autocorrelation computing unit 192. As shown in FIG. 21A, the correlation length autocorrelation computing unit 192 computes an autocorrelation function 211 for the time series data 210 of the correlation length $\tau_L$. The computation equation is the same as the previously mentioned equation 4. These computation results are shown in FIG. 21B. Here, $Ct(\alpha)$, which is the result of the computation of the autocorrelation function 211 for the time series data 210 of the correlation length $\tau_L$, is outputted to the peak detection unit 193.

Note that the fragment extraction line parameter change signal is b, which is parameters of the fragment extraction line.

Next, the peak detection unit 193 is described. In the peak detection unit 193, a peak position a w is detected from the autocorrelation function $Ct(\alpha)$ of the correlation length as inputted from the correlation length autocorrelation function computing unit, and by testing whether or not the detected peak position $Ct(\alpha)$ matches with the movement period of the moving object, judges whether or not that object is a moving object. In the case where a moving object is judged, the position of existence and movement direction of the moving object is specified and outputted to the display unit 18.

In other words, the autocorrelation function $Ct(\alpha)$ of the correlation length is a scale indicating how much $\tau_L(t+\alpha)$, which is $\tau_L(t)$ sheared an interval, resembles $\tau_L(t)$.

In the present embodiment, detection of the peak position $\alpha_W$ is executed by executing a search from position $\alpha=0$ and detecting the initial peak, but it is also acceptable to use another peak detection method, and it is also acceptable to use a method which searches a peak near the number of frames set by the designer, as mentioned later.

The case where the movement period of one step amount of movement in the present embodiment is described. The peak detection unit 193 judges a moving object in the case where the peak position $\alpha_W$ is a number of frames needed in one step of movement. The number of frames needed in one step of movement differs depending on how many frames can be acquired in one second by the video processing unit 11, but in the present embodiment, in the case where 30 frames are inputted in one second, the number of frames needed in one step of movement is 20 frames to 30 frames, and the peak position $\alpha$ judges a moving object in the case where the peak of the autocorrelation function $Ct(\alpha)$ of the correlation length is detected in a space of 20 frames to 30 frames. This number of frames can be determined freely by the designer. Note that in the case where moving object judgment is executed with higher precision, it is also possible to detect the movement period with 2 or more steps as one unit. In that case, the number of frames determined by the designer can be compatible by doubling the number of steps.

In addition, it is also possible to judge periodicity in the same manner, in the case where an animal such as a dog and a cat are detected.

Furthermore, instead of computing the autocorrelation function $Ct(\alpha)$, it is also possible to use a Fourier transform. In this case, whether or not a peak exists in a specific rate is judged.

Note that in the present embodiment, the case where an image is inputted in each frame is described, but it is also acceptable to use an image which is sampled in fixed periods of time. In that case, it is acceptable to compute the peak position $\alpha_W$ of the peak detection unit 193 from the time necessary for the moving object to move one step.

In addition, the peak detection unit 193 outputs the fragment extraction line parameter change signal, which is a signal indicating a change in the parameters for extracting the spatiotemporal fragment, to the spatiotemporal fragment extraction unit 14.

Thereafter, in the same manner, the spatiotemporal fragment extraction unit 14 creates the spatiotemporal fragment in accordance with the parameters from the spatiotemporal data, based on the restriction of the parameters obtained from the movement direction calculation unit, until input of the fragment extraction line parameter change signal finishes. Here, it is acceptable for the fragment extraction line parameter change signal to, based on the movement direction of the moving object candidate as calculated by the movement direction calculating unit, executed parameter changes on all parameter candidates, as well as until moving object detection is executed in the attribute output unit 17.

Next, in the case where peaks unique to the movement of a moving object are detected from the autocorrelation function of the correlation length, the peak detection unit 193 sends the fragment extraction line parameters to the coordinate transformation unit 194.

Next, the coordinate transformation unit 194 transforms the straight line in the image of when the peak was detected by the peak detection unit 194 into a straight line in world coordinates. The human body region movement model spatiotemporal fragment output unit 15 generates a human movement model in accordance with the straight line transformed here into the world coordinate system. The operations thereafter are the same as in the first embodiment.

The attribute output unit 17 specifies the position of existence and movement direction of the moving object and outputs the position of existence and movement direction to the display unit 18.

Next, the spatiotemporal fragment verification unit 16, in the same manner as in the first embodiment, executes verification between the spatiotemporal fragment 70 of when the peak is detected by the periodicity analysis unit 190 and human body region movement model spatiotemporal fragment 71, and outputs the fragment extraction line parameter change signal, which is a signal indicating parameters change in the fragment extraction line, to the spatiotemporal fragment extraction unit 14.

Thereafter, in the same manner, the spatiotemporal fragment extraction unit 14 creates a spatiotemporal fragment in accordance with the parameters from the spatiotemporal data until input of the fragment extraction line parameter change signal finishes. Here, it is acceptable for the fragment extraction line parameter change signal to, based on the movement direction of the moving object candidate as calculated by the movement direction calculating unit, execute parameter changes on all parameter candidates, as well as until moving object detection is executed in the attribute output unit 17.

Note that the fragment extraction line parameter change signal is a and b, which are parameters of the fragment extraction line.

The processing thereafter is the same as in the first embodiment, and therefore description is omitted here.

As described above, according to the present embodiment, by calculating the movement direction of a moving object and analyzing the periodicity of the moving object, the parameters of the fragment extraction line 23 and the parameters of the human movement model can be reduced, and through that reduction, faster human detection is possible, as compared to a chase where spatiotemporal fragment verification is executed while searching all parameters.

Sixth Embodiment

Next, a human model fitting device in the sixth embodiment of the present invention is described.

Figure 22:
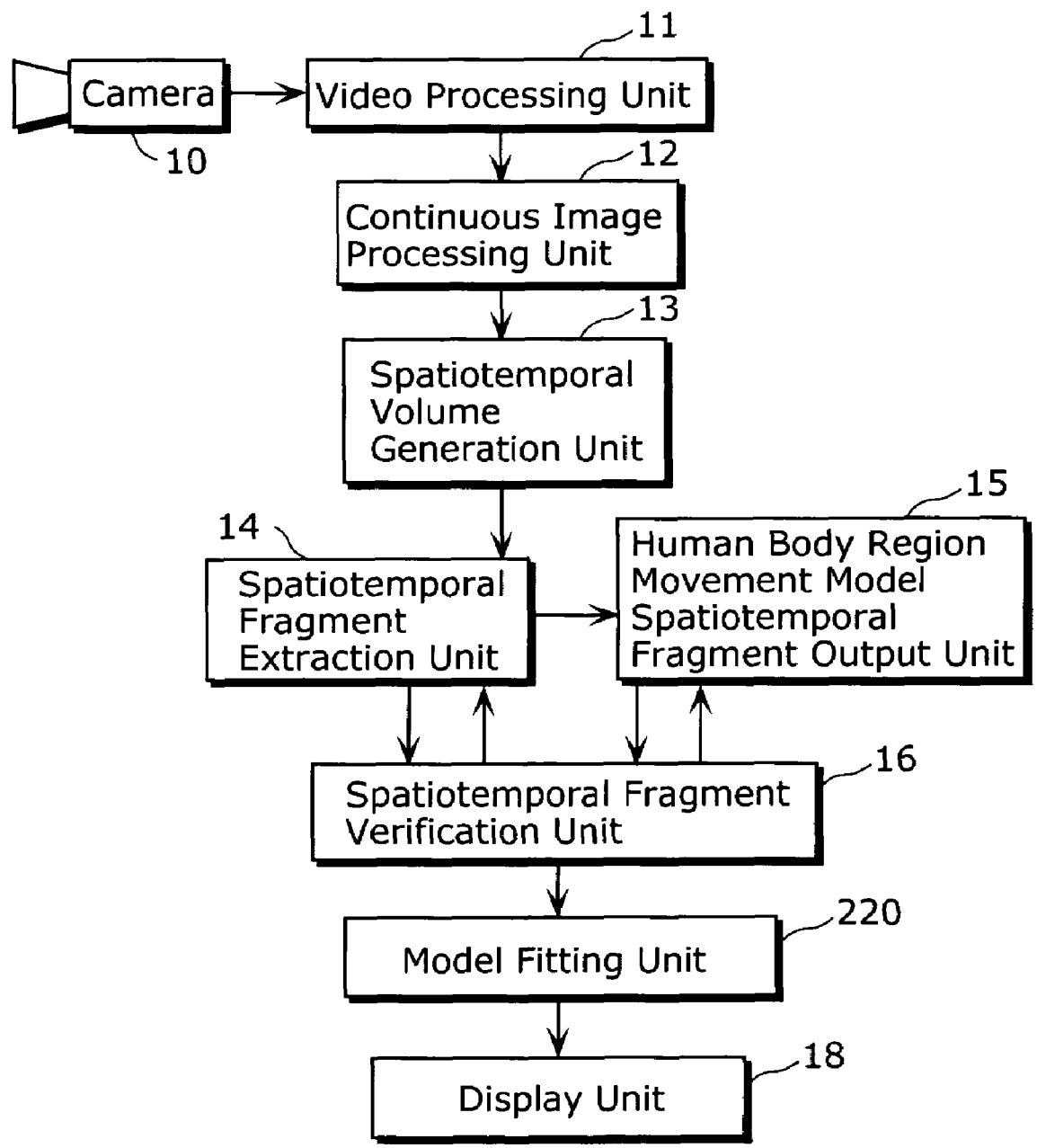
FIG. 22 is a function block diagram showing a configuration of a human model fitting device in the sixth embodiment of the present invention.

FIG. 22 is a function block diagram showing a configuration of a human model fitting device in the sixth embodiment of the present invention. This human model fitting device is a device which fits a model to a human existing in an image, without having to attach a particular device such as a marker to an image subject. The human model fitting device includes a camera 10, a video processing unit 11, a continuous image processing unit 12, a spatiotemporal volume generation unit 13, a spatiotemporal fragment extraction unit 14, a human body region movement model spatiotemporal fragment output unit 15, a spatiotemporal fragment verification unit 16, a display unit 18, and a human fitting unit 220. This configuration corresponds to a configuration of a human detection device in the first embodiment that has replaced a configuration element of an attribute output unit 17 with the model fitting unit 220. Description centered on the points differing from the first embodiment is given below.

Note that fitting of the human model is executing fitting of a human movement model to a human existing in an image, and here, determines a value of parameters of the human movement model shown in FIG. 7 (a value matching the movement of the human existing in the image).

Below, an operation of the human model fitting device in the present embodiment is described. Note that as the camera 10, the video processing unit 11, the continuous image processing unit 12, the spatiotemporal volume generation unit 13, the spatiotemporal fragment extraction unit 14, the human body region movement model spatiotemporal fragment output unit 15, and the spatiotemporal fragment verification unit 16 have the same operation as in the first embodiment, descriptions are omitted.

Figure 23:
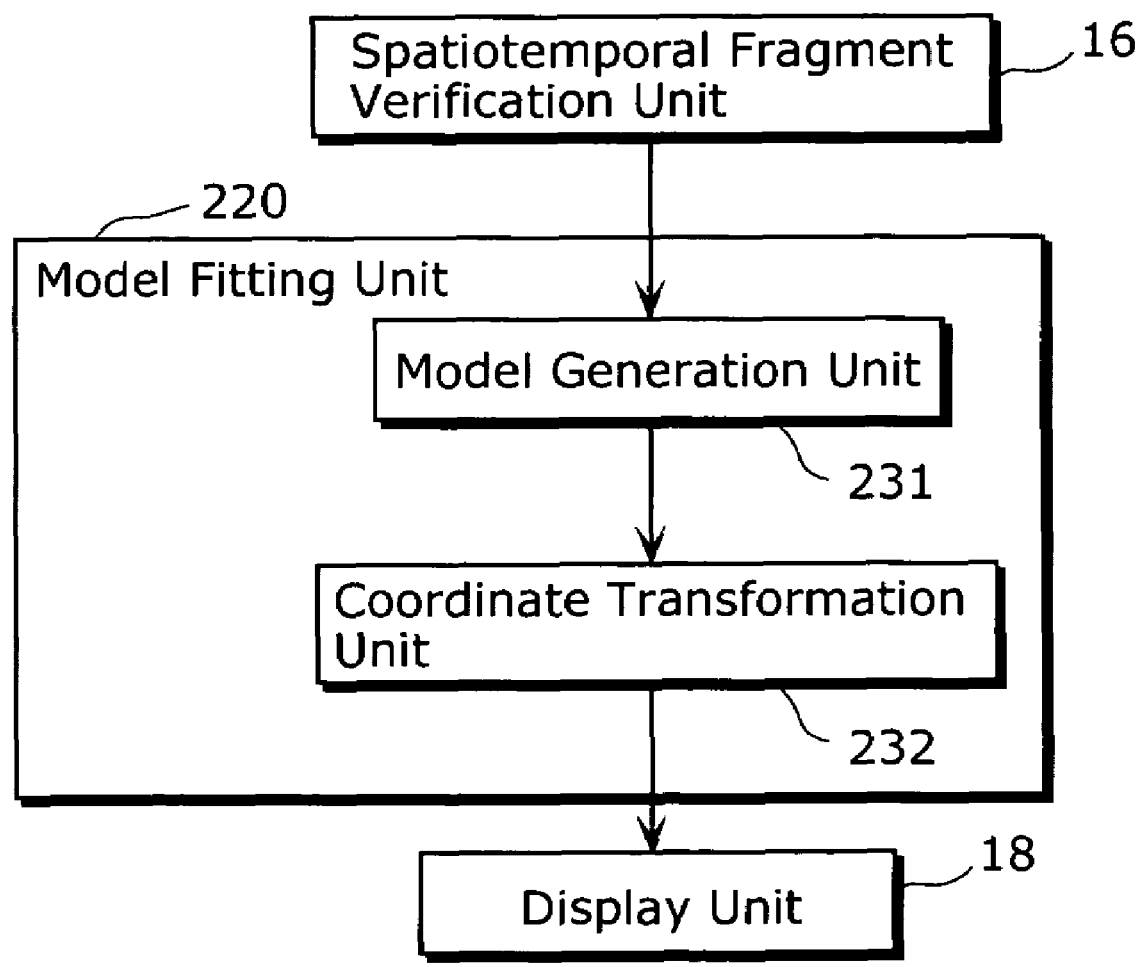
FIG. 23 is a function block diagram showing a configuration of a human model fitting unit in the sixth embodiment of the present invention.

As shown in FIG. 23, the model fitting unit includes a model generation unit 231 and a coordinate transformation unit 232.

First, the model generation unit 231 re-generates the human movement model shown in FIG. 7 from the result of a combination of parameters indicating a position of existence of a human in world coordinates that are outputted by the spatiotemporal fragment verification unit 16. As a length L and a groin area angle $\theta_L$ of legs of the human movement model are already known, it is possible to generate the human movement model shown in FIG. 7 from these parameters.

Here, the model generation unit 231 has the same function as a human movement model generation unit 50 included in the human body region movement model spatiotemporal fragment output unit 15.

In addition, because this human movement model holds as parameters the position of existence and movement direction in world coordinates, by executing coordinate transformation in the coordinate transformation unit 232, fitting of the human movement model is executed in the image. Specifically, of the combination of parameters that obtain a high matching score, the fragment extraction line parameter $\theta_W$ is equivalent to a gait direction in world coordinates, and the human movement model parameter $(x_{start}, y_{start})$ is equivalent to the human's position of existence. Additionally, a detection time is calculated from a number of steps of a scan processing executed by a verification processing unit 150 in the spatiotemporal fragment reference unit 16, which is attached to the combination of parameters. Fitting is executed by superimposing a model which executed coordinate transformation over an image occurring in that time.

Finally, the display unit 18 displays the image fitted by the model fitting unit 220.

As described above, according to the present embodiment, a model can be fitted to a human existing in the image, without having to attach a particular device such as a marker to the image subject.

Note that it is also possible for the present embodiment to take on a configuration which shortens calculation time, as in the second, fourth, and fifth embodiments.

The human detection device, human verification device, and human model fitting device according to the present invention have hereby been described based on 6 embodiments, but the present invention is not limited to these embodiments.

For example, in the first embodiment and so on, the human movement model generation unit 15 of the human body region movement model spatiotemporal fragment output unit 15 generates a human model with specific parameters based on the fragment extraction line parameters outputted from the spatiotemporal fragment extraction unit 14, but it is also acceptable to retain, in advance, a plurality of human movement model templates, and select and output an optimum template from that plurality of templates. As an example, as shown in FIG. 24, the human body region movement model spatiotemporal fragment output unit 15 selects, from human movement model templates divided into the types adult (man), adult (woman), child, and elderly person, a template that is closest to the parameters outputted by the spatiotemporal fragment extraction unit 14, and outputs the human body region movement model spatiotemporal fragment of the selected human movement model template. Then, the spatiotemporal fragment verification unit 16 executes verification between the spatiotemporal fragment outputted from the spatiotemporal fragment extraction unit 14 and the human body region movement model spatiotemporal fragment outputted from the human body region movement model spatiotemporal fragment output unit 15. In the case where the verification result does not satisfy as constant criteria, the human body region movement model spatiotemporal fragment output unit 15 selects the human movement model template that is to be the next candidate and outputs the human body region movement model spatiotemporal fragment of that human movement model template, and the spatiotemporal fragment verification unit 16 repeats verification. Through this, the human movement model template with the highest alignment is determined, and the type of human in the target image is determined.

Note that in the human movement model template shown in FIG. 24, each parameter is set as one value, but setting a constant scope (for example, 300 to 700 mm for parameters L of a child, and so on) is also acceptable. In this case, it is acceptable to search for the human movement model template with an optimum value and optimum type through the spatiotemporal fragment verification unit 16 repeating verification computation within the set scope.

In addition, it is acceptable to, as shown in FIG. 25, prepare a plurality of templates for different states of a road that is walked, and, as shown in FIG. 26, prepare a plurality of templates for different degrees of congestion occurring in the walked place, rather than limiting the templates to different types of humans. Through this, by searching for the human movement model template that generates the human body region movement model spatiotemporal fragment which is closest to spatiotemporal fragment obtained from the image, not only the human, but also each type of state of the environment being walked can be judged. In other words, not only the type of the human, but also the road state, degree of congestion in the walked area, and so on can, to an extent, be estimated from a video in which the human is walking.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be utilized as a human detection device which detects the position of existence, gait direction, and so on of a human; for example, as a surveillance device installed in a facility or on the street, an authentication device used when entering and exiting a building, and the like; and in particular, as a human detection device and human verification device able to execute human detection even in a case where the present position and gait direction of the human are not already known, without limiting a detection area in the image.

What is claimed is:

1. A human detection device which detects a human within a moving picture, said device comprising:
a spatiotemporal volume generation unit configured to generate a three-dimensional spatiotemporal image in which frame images are arranged along a temporal axis, the frame images making up the moving picture in which a human has been filmed;
a spatiotemporal fragment extraction unit configured to extract, from the generated three-dimensional spatiotemporal image, a real image spatiotemporal fragment which is an image appearing in a cut plane or cut fragment when the three-dimensional spatiotemporal image is cut;
a spatiotemporal fragment output unit configured to generate and output, based on a human movement model which defines a characteristic of a movement of a human, a human body region movement spatiotemporal fragment, which is a spatiotemporal fragment obtained from the movement by the human movement model;
a spatiotemporal fragment verification unit configured to verify a real image spatiotemporal fragment extracted by said spatiotemporal fragment extraction unit with a human body region movement model spatiotemporal fragment outputted by said spatiotemporal fragment output unit;
an attribute output unit configured to output a human attribute which includes a presence/absence of a human in the moving picture, based on a verification result of said spatiotemporal fragment verification unit; and
a display unit configured to display the presence/absence of a human based on the output of said attribute unit.

2. The human detection device according to claim 1, wherein said spatiotemporal fragment extraction unit is configured to determine a fragment extraction line that cuts the frame image, and extract the real image spatiotemporal fragment with a plane obtained by arranging the determined fragment extraction line along a temporal axis as a cut plane.

3. The human detection device according to claim 2, wherein said spatiotemporal fragment extraction unit is configured to extract the real image spatiotemporal fragment using a fragment extraction line which cuts the legs of a human in the three-dimensional spatiotemporal image, and
said spatiotemporal fragment output unit is configured to generate, based on a human movement model which defines a gait characteristic of a human, a human body region movement model spatiotemporal fragment obtained through a cut plane which cuts the legs occurring in a gait time of the human movement model.

4. The human detection device according to claim 3, wherein the human movement model is represented by two line segments joined together at one end which correspond to two legs, and each line segment is defined as rotating central to the joined point at a constant angular rate and rotating alternately to a maximum angle of 2 L.

5. The human detection device according to claim 3, wherein said spatiotemporal fragment verification unit is configured to execute the verification by calculating the degree of matching between the real image spatiotemporal fragment and an image obtained when one step part of a human body region movement model spatiotemporal fragment outputted by said spatiotemporal fragment output unit is scanned in a temporal direction.

6. The human detection device according to claim 2, further comprising
a movement direction calculation unit configured to calculate, from a three-dimensional spatiotemporal image generated by said spatiotemporal volume generation unit, a movement direction of a moving object that exists in the three-dimensional spatiotemporal image,
wherein said spatiotemporal fragment extraction unit is configured to determine the fragment extraction line in accordance with a movement direction calculated by said movement direction calculation unit.

7. The human detection device according to claim 6, wherein said movement direction calculation unit is configured to extract the moving object in each frame image that makes up the three-dimensional spatiotemporal image, and to calculate a movement direction of the moving object by obtaining a motion vector occurring between frame images of an extracted moving object.

8. The human detection device according to claim 6, wherein said movement direction calculation unit is configured to separate each frame which makes up the three-dimensional spatiotemporal image into subregions, and to calculate a movement direction of the moving object by obtaining a motion vector between adjacent frame images subregion by subregion.

9. The human detection device according to claim 2, wherein the fragment extraction line is a straight line or a curved line.

10. The human detection device according to claim 1, wherein said attribute output unit is configured to calculate and output a position and movement direction of a human in the moving picture from parameters which specify the cut plane or cut fragment and parameters which specify the human movement model, in the case where the real image spatiotemporal fragment and the human body region movement model spatiotemporal fragment are verified as matching according to a constant criteria.

11. The human detection device according to claim 10, further comprising
a display unit configured to display a human attribute which includes the position and movement direction of a human outputted by said attribute output unit.

12. The human detection device according to claim 1, further comprising
a periodicity analysis unit configured to analyze whether or not a real image spatiotemporal fragment extracted by said spatiotemporal fragment extraction unit is an image corresponding to a periodic movement unique to a gait of a human,
wherein said spatiotemporal fragment extraction unit is configured to change a fragment extraction line based on an analysis result from said periodicity analysis unit, and using the changed fragment extraction line, extract a real image spatiotemporal fragment again.

13. The human detection device according to claim 12, wherein said periodicity analysis unit is configured to generate time-series data of a correlation length by obtaining an autocorrelation function for one-dimensional data that indicates an image in each time, which makes up the real image spatiotemporal fragment, and in the case where a periodicity exists in the generated time-series data of the correlation length, analyzes that the real image spatiotemporal fragment is an image based on a period movement unique to the gait of a human.

14. The human detection device according to claim 13, wherein said periodicity analysis unit is configured to obtain a graph indicating a change in the autocorrelation function value for the correlation length, by finding an autocorrelation function for the time-series data of the correlation length, and in the case where a peak exists in that graph, judges that a periodicity exists in the time-series data of the correlation length.

15. The human detection device according to claim 1, further comprising
a parameter searching unit configured to search for the optimum parameters which specify the cut plane or cut fragment and the optimum parameters which specify the human movement model, by executing at least one of the following: causing re-extraction of a real image spatiotemporal fragment after causing said spatiotemporal fragment extraction unit to change parameters specifying the cut plane or cut fragment based on a verification result from said spatiotemporal fragment verification unit; and causing re-output of a human body region movement model spatiotemporal fragment after causing said spatiotemporal fragment output unit to change parameters specifying the human movement model.

16. The human detection device according to claim 15, wherein said parameter searching unit is configured to search for the optimum parameters using a genetic algorithm.

17. The human detection device according to claim 1, wherein said spatiotemporal volume generation unit is configured to generate the three-dimensional spatiotemporal image by superimposing at least one image obtained through binarization after the frame image is background-differentiated or frame-differentiated.

18. The human detection device according to claim 1, wherein said spatiotemporal fragment output unit is configured to generate and output a human body region movement model spatiotemporal fragment which corresponds to a human movement model selected from a pre-recorded plurality of differing types of human movement models, and
said spatiotemporal fragment verification unit is configured to repeat the verification by causing said spatiotemporal fragment output unit to generate and output a human body region movement model spatiotemporal fragment which corresponds to a new human movement model, in the case where result of the verification does not fulfill a constant criteria.

19. The human detection device according to claim 18, wherein in the plurality of human movement models pre-recorded by said spatiotemporal fragment output unit, at least one of the following differ: the sex of a human to be modeled, the age of the human, a state of a road surface on which the human walks, and a degree of congestion in a walked area.

20. A human verification device which verifies an image of a human included in a moving picture with a pre-stored image of a human, said device comprising:
the human detection device according to claim 1;
a verification camera having at least one of the functions of pan, tilt, and zoom;
a camera control unit configured to control at least one of the pan, tilt, and zoom of said verification camera, based on a position or movement direction of a human detected by said human detection device; and
a human verification unit configured to verify an image of a human filmed by said verification camera with a pre-stored image of a human.

21. A human model fitting device which causes a human movement model defining a movement characteristic of a human to be fitted to a movement of a human in an image, said device comprising:
a spatiotemporal volume generation unit configured to generate a three-dimensional spatiotemporal image in which frame images that make up the moving picture in which a human has been filmed are arranged along a temporal axis;
a spatiotemporal fragment extraction unit configured to extract a real image spatiotemporal fragment, which is an image appearing in a cut plane or cut fragment when the three-dimensional spatiotemporal image is cut, from the generated three-dimensional spatiotemporal image;
a spatiotemporal fragment output unit configured to generate and output a human body region movement spatiotemporal fragment, which is a spatiotemporal fragment obtained from a movement by the human movement model;
a spatiotemporal fragment verification unit configured to verify a real image spatiotemporal fragment extracted by said spatiotemporal fragment extraction unit with a human body region movement model spatiotemporal fragment outputted by said spatiotemporal fragment output unit;
a model fitting unit configured to determine a value of parameters which specifies the human movement model so that the human movement model indicates a movement of a human occurring in the moving picture, based on a verification result from said spatiotemporal fragment verification unit;

a display unit configured to display the presence/absence of a human based on an output of said model fitting unit.

22. A human detection method for detecting a human contained in a moving picture, wherein said method comprises using a computer processor to perform the steps of:

generating, using a spatiotemporal volume generation unit, a three-dimensional spatiotemporal image in which frame images that make up the moving picture in which a human has been filmed are arranged along a temporal axis;

extracting, using a spatiotemporal fragment extraction unit, and from the generated three-dimensional spatiotemporal image, a real image spatiotemporal fragment, which is an image appearing in a cut plane or cut fragment when the three-dimensional spatiotemporal image is cut;

outputting, using a spatiotemporal fragment output unit, and based on a human movement model which defines a characteristic of the movement of a human, a human body region movement spatiotemporal fragment, which is a spatiotemporal fragment obtained from a movement by the human movement model;

verifying, using a spatiotemporal fragment verification unit, a real image spatiotemporal fragment extracted in said extracting with a human body region movement model spatiotemporal fragment outputted in said outputting; and outputting, using an attribute output unit, a human attribute which includes a presence/absence of a human in the moving picture, based on a verification result of said verifying.

23. A computer readable medium having a program embodied thereon for a device which detects a human contained in a moving picture, said program causing a computer to execute the human detection method of claim 22.

24. A human verification method which verifies an image of a human contained in a moving picture with a pre-stored image of a human, wherein said method comprises the human detection method of claim 22, and further comprises using a computer processor to perform the steps of:

controlling at least one of the pan, tilt, and zoom of said verification camera, based on a position or movement direction of a human detected in said human detection method; and verifying an image of a human filmed by said verification camera with a pre-stored image of a human.

25. A computer readable medium having a program embodied thereon for verifying between an image of a human contained in a moving picture and a pre-stored image of a human, said program causing a computer to execute the steps included in the human verification method of claim 24.

26. A human model fitting method which causes a human movement model defining a movement characteristic of a human to be fitted to a movement of a human in an image, wherein said method comprises using a computer processor to performs the steps of:

generating, using a spatiotemporal volume generation unit, a three-dimensional spatiotemporal image in which frame images that make up the moving picture in which a human has been filmed are arranged along a temporal axis;

extracting, using a spatiotemporal fragment extraction unit, a real image spatiotemporal fragment, which is an image appearing in a cut plane or cut fragment when the three-dimensional spatiotemporal image is cut, from the generated three-dimensional spatiotemporal image;

generating and outputting, using a spatiotemporal fragment output unit, a human body region movement spatiotemporal fragment, which is a spatiotemporal fragment obtained from a movement by the human movement model;

verifying, using a spatiotemporal fragment verification unit, a real image spatiotemporal fragment extracted in said extracting with a human body region movement model spatiotemporal fragment outputted in said outputting; and determining, using a model fitting unit, a value of parameters which specifies the human movement model so that the human movement model indicates a movement of a human occurring in the moving picture, based on a verification result of said verification.

27. A computer readable medium having a program embodied thereon for a device which causes a human movement model defining a movement characteristic of a human to be fitted to a movement of a human in an image, said program causing a computer to execute the steps included in the human model fitting method of claim 26.

* * * * *